(12) United States Patent
Wei et al.

(10) Patent No.: US 11,211,001 B2
(45) Date of Patent: Dec. 28, 2021

(54) DISPLAY DEVICE WITH FEEDBACK VIA SERIAL CONNECTIONS BETWEEN DISTRIBUTED DRIVER CIRCUITS

(71) Applicant: Huayuan Semiconductor (Shenzhen) Limited Company, Shenzhen (CN)

(72) Inventors: Chih-Chang Wei, Taoyuan (TW); Junjie Zheng, Cupertino, CA (US); Richard Landry Gray, Taipei (TW); Yung-Ting Chen, Changhua County (TW); Lilun Chi, Taipei (TW)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 17/067,427

(22) Filed: Oct. 9, 2020

(65) Prior Publication Data
US 2021/0366391 A1 Nov. 25, 2021

Related U.S. Application Data

(60) Provisional application No. 63/029,389, filed on May 22, 2020, provisional application No. 63/042,548, (Continued)

(51) Int. Cl.
*G09G 3/3233* (2016.01)
*G09G 3/34* (2006.01)

(52) U.S. Cl.
CPC ......... *G09G 3/3233* (2013.01); *G09G 3/3426* (2013.01); *G09G 2300/0804* (2013.01);
(Continued)

(58) Field of Classification Search
CPC ............... G09G 3/3233; G09G 3/3426; G09G 2300/0804; G09G 2310/0286;
(Continued)

(56) References Cited

U.S. PATENT DOCUMENTS 10,490,143 B2   11/2019  Kumamoto et al.
10,593,256 B2    3/2020  Li et al.
(Continued)

OTHER PUBLICATIONS

United States Office Action, U.S. Appl. No. 17/067,432, filed Apr. 6, 2021, 11 pages.
(Continued)

*Primary Examiner* — Sejoon Ahn
(74) *Attorney, Agent, or Firm* — Fenwick & West LLP

(57) ABSTRACT

Embodiments relate to a display device that includes a control circuit, an array of light emitting diode (LED) zones, and an array of zone integrated circuits that are distributed in the display area. The zone integrated circuits may comprise integrated LED and driver circuits and may include sensor circuits. The zone integrated circuits are arranged in groups that are coupled to each other and to the control circuit in a serial communication chain via serial communication lines. The control circuit provides control signals that control the driver circuits to drive the LED zones and may provide commands to request readback data from the zone integrated circuits. Responsive to the commands, the zone integrated circuits output readback data to the control circuit via the serial communication chain.

26 Claims, 14 Drawing Sheets

Related U.S. Application Data filed on Jun. 22, 2020, provisional application No. 63/059,737, filed on Jul. 31, 2020.

(52) U.S. Cl.
CPC ............... *G09G 2310/0243* (2013.01); *G09G 2310/0286* (2013.01); *G09G 2320/041* (2013.01); *G09G 2320/0626* (2013.01); *G09G 2320/0693* (2013.01); *G09G 2330/02* (2013.01); *G09G 2330/08* (2013.01); *G09G 2330/12* (2013.01); *G09G 2370/00* (2013.01)

(58) Field of Classification Search
CPC ..... G09G 2320/041; G09G 2320/0626; G09G 2320/0693; G09G 2330/02; G09G 2330/08; G09G 2330/12; G09G 2370/00
See application file for complete search history.

(56) References Cited

U.S. PATENT DOCUMENTS

| | | |
|---|---|---|
| 10,789,896 B2 | 9/2020 | Liu et al. |
| 10,909,911 B1 | 2/2021 | Zheng et al. |
| 10,950,194 B1 | 3/2021 | Chan et al. |
| 2006/0092346 A1 | 5/2006 | Moon et al. |
| 2007/0035706 A1 | 2/2007 | Margulis |
| 2008/0136769 A1 | 6/2008 | Kim et al. |
| 2008/0136770 A1 | 6/2008 | Peker et al. |
| 2010/0309100 A1 | 12/2010 | Cok et al. |
| 2011/0109228 A1 | 5/2011 | Shimomura et al. |
| 2012/0050343 A1 | 3/2012 | Kim et al. |
| 2014/0152902 A1 | 6/2014 | Morrisseau |
| 2016/0088251 A1* | 3/2016 | Luo .................... H04N 5/37452 250/208.1 |
| 2017/0269782 A1* | 9/2017 | Wu ...................... H01L 27/1222 |
| 2020/0211496 A1* | 7/2020 | Wang ....................... G09G 3/20 |
| 2020/0211500 A1* | 7/2020 | Canberk ............. G06F 3/04847 |
| 2020/0211502 A1* | 7/2020 | Kim ....................... G09G 3/006 |
| 2020/0212137 A1* | 7/2020 | Wang ..................... G09G 3/325 |
| 2020/0312220 A1 | 10/2020 | Hussell et al. |

OTHER PUBLICATIONS

United States Office Action, U.S. Appl. No. 17/067,432, filed May 13, 2021, 13 pages.

\* cited by examiner

DISPLAY DEVICE WITH FEEDBACK VIA SERIAL CONNECTIONS BETWEEN DISTRIBUTED DRIVER CIRCUITS

CROSS-REFERENCE TO RELATED APPLICATIONS

This application claims the benefit of U.S. Provisional Application No. 63/029,389 filed on May 22, 2020, U.S. Provisional Application No. 63/042,548 filed on Jun. 22, 2020, and U.S. Provisional Application No. 63/059,737 filed on Jul. 31, 2020, which are each incorporated by reference herein.

BACKGROUND

This disclosure relates generally to light emitting diodes (LEDs) and LED driver circuitry for a display, and more specifically to a display architecture with distributed driver circuits.

LEDs are used in many electronic display devices, such as televisions, computer monitors, laptop computers, tablets, smartphones, projection systems, and head-mounted devices. Modern displays may include well over ten million individual LEDs that may be arranged in rows and columns in a display area. In order to drive each LED, current methods employ driver circuitry that requires significant amounts of external chip area that impacts the size of the display device.

SUMMARY

In a first aspect, a display device comprises an array of light emitting diode zones, a group of driver circuits distributed in the display area, a control circuit, and a set of serial communication lines coupled between adjacent driver circuits in the group and to the control circuit in a serial communication chain. The control circuit generates driver control signals and command signals. The group of driver circuits each drive a respective light emitting diode zone by controlling the respective driver currents in response to the driver control signals. The light emitting diode zones each comprise one or more light emitting diodes that generate light in response to respective driver currents. Furthermore, responsive to a target driver circuit in the group of driver circuits receiving a command signal from the control circuit, the target driver circuit outputs a readback signal and the group of driver circuits propagates the readback signal from the target driver circuit through the serial communication chain to the control circuit.

In a second aspect, a driver circuit comprises control logic, and a set of external pins including at least an LED driving output pin, a data input pin, a data output pin, and a ground pin. The control logic operates in at least an addressing mode and an operational mode. In the operational mode, the control logic obtains a driver control signal and controls a driver current to an LED zone based on the driver control signal. In the addressing mode, the control logic obtains an incoming addressing signal, stores an address for the driver circuit based on the incoming addressing signal, and generates an outgoing addressing signal based on the incoming addressing signal. The LED driving output pin controls the driver current during the operational mode. The data input pin receives the incoming addressing signal during the addressing mode and receives commands or data from a previous driver circuit in a serial communication chain during the operational mode. The data output pin outputs the outgoing addressing signal during the addressing mode and outputs the commands or data to a next driver circuit in the serial communication chain during the operational mode. The ground pin provides a path to ground.

In a third aspect, a zone integrated circuit for a display device comprises one or more LEDs of an LED zone and a driver circuit stacked under the one or more LEDs on a substrate in an integrated package. The driver circuit may comprise the features described above.

BRIEF DESCRIPTION OF THE DRAWINGS

The teachings of the embodiments of the present invention can be readily understood by considering the following detailed description in conjunction with the accompanying drawings.

Figure (FIG. 1 is a circuit diagram of a display device including distributed driver circuits that provide feedback via a serial communication chain, according to one embodiment.

The features and advantages described in the specification are not all inclusive and, in particular, many additional features and advantages will be apparent to one or ordinary skill in the art in view of the drawings, specification, and claims. Moreover, it should be noted that the language used in the specification has been principally selected for readability and instructional purposes, and may not have been selected to delineate or circumscribe the inventive aspect matter.

DETAILED DESCRIPTION OF EMBODIMENTS

Embodiments relate to a display device that includes a control circuit, an array of light emitting diode (LED) zones, and an array of zone integrated circuits that are distributed in the display area. The zone integrated circuits may comprise integrated LED and driver circuits and may include sensor circuits. The zone integrated circuits are arranged in groups that are coupled to each other and to the control circuit in a serial communication chain via serial communication lines. The control circuit provides control signals that control the driver circuits to drive the LED zones and may provide commands to request readback data from the zone integrated circuits. Responsive to the commands, the zone integrated circuits output readback data to the control circuit via the serial communication chain.

Figure 1:
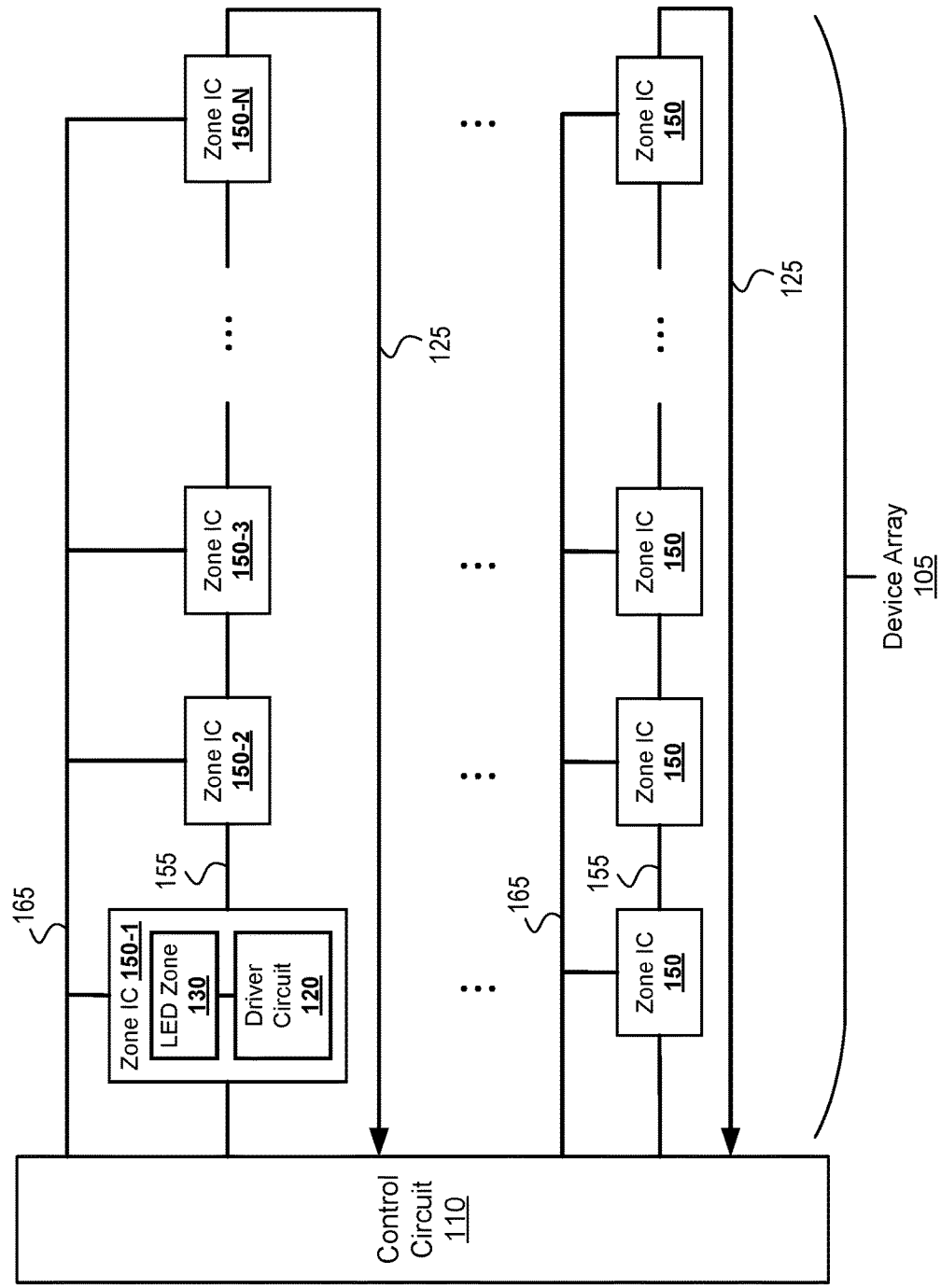

Figure (FIG. 1 is a circuit diagram of an electronic device 100. In one example embodiment, the electronic device 100 can be a display device for displaying images or video. In various embodiments, the electronic device 100 may be implemented in any suitable form-factor, including a display screen for a computer display panel, a television, a mobile device, a billboard, etc. The electronic device 100 may comprise a liquid crystal display (LCD) device or an LED display device. In an LCD display device, LEDs provide white light backlighting that passes through liquid crystal color filters that control the color of individual pixels of the display. In an LED display device, LEDs are directly controlled to emit colored light corresponding to each pixel of the display. In other embodiments, the electronic device 100 may comprise an array of sensors (e.g., temperature sensors, light sensors, voltage sensors) that may be utilized in conjunction with a display device or other device.

The electronic device 100 may include a device array 105 and a control circuit 110. The device array 105 comprises an array of zone integrated circuits (ICs) 150 (e.g., a two-dimensional array comprising rows and columns). In a display device, at least some of the zone ICs 150 may each include an LED zone 130 comprising one or more LEDs and an associated driver circuit 120 that drives the LED zone 130. The driver circuit 120 and corresponding LED zone 130 may be embodied in an integrated package such that the LED zone 130 is stacked over the driver circuits 120 on a substrate as further described in FIGS. 10-12. Alternatively, a zone IC 150 may comprise a driver circuit 120 coupled to an external LED zone that is not necessarily integrated with the driver circuit 120.

In an LCD display, an LED zone 130 can includes one or more LEDs that provides backlighting for a backlighting zone, which may include a one-dimensional or two-dimensional array of pixels. In an LED display, the LED zone 130 may comprise one or more LEDs corresponding to a single pixel or may comprise a one-dimensional array or two-dimensional array of LEDs corresponding to an array of pixels (e.g., one or more columns or rows). For example, in one embodiment, the LED zone 130 may comprise one or more groups of red, green, and blue LEDs that each correspond to a sub-pixel of a pixel. In another embodiment, the LED zone 130 may comprise one or more groups of red, green, and blue LED strings that correspond to a column or partial column of sub-pixels or a row or partial row of sub-pixels. For example, an LED zone 130 may comprise a set of red sub-pixels, a set of green sub-pixels, or a set of blue sub-pixels.

The LEDs of each LED zone 130 may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The zone ICs 150 may furthermore include integrated sensors. For example, the driver circuit 120 may include one or more integrated sensors such as integrated temperature sensors, light sensors, voltage sensors, image sensors, or other sensing devices. In other instances, a zone IC 150 may comprise a dedicated sensor device that does not drive an LED zone 130 and instead performs one or more sensing functions.

The zone ICs 150 may be arranged in groups (e.g., rows) that share common power supply lines (including driver circuit supply lines and LED zone supply lines) and/or communication lines. For example, the zone ICs 150 in a group may be coupled in parallel to a shared command line 165. In an embodiment, the shared command line 165 may comprise a power communication line that supplies both power and data to the zone IC 150 as a supply voltage modulated with digital data. Alternatively, the shared command line 165 may comprise a dedicated signal line and power may be supplied to the zone ICs 150 via a separate dedicated supply line (not shown).

Serial communication lines 155 also couple the zone ICs 150 of a group in series to each other and to the control circuit 110 to enable communications between the zone ICs 150 and the control circuit 110 via a serial chain. The serial communication lines 155 may be configured for unidirectional or bidirectional communication in different embodiments. In the case of unidirectional serial communication lines 155, a readback line 125 may couple the last zone IC 150-N in each group to the control circuit 110. In the case of bidirectional serial communication lines 155, the readback line 125 may be optionally omitted.

The zone ICs 150 may operate in various modes including at least an addressing mode, a configuration mode, and an operational mode. During the addressing mode, the control circuit 110 initiates an addressing procedure to cause assignment of addresses to each of the zone ICs 150. During the configuration and operational modes, the control circuit 110 transmits commands and data that may be targeted to specific zone ICs 150 based on their addresses. In the configuration mode, the control circuit 110 configures driver circuits 120 with one or more operating parameters (e.g., overcurrent thresholds, overvoltage thresholds, clock division ratios, and/or slew rate control). During the operational mode, the control circuit 110 provides control data to the driver circuits 120 that causes the driver circuits to control the respective driver currents to the LED zones 130, thereby controlling brightness. The control circuit 110 may also issue commands to the zone ICs 150 during the operational mode to request readback data (e.g., sensor data), and the zone ICs 150 provide the requested readback data to the control circuit 110 in response to the commands.

The serial communication lines 155 may be utilized in the addressing mode to facilitate assignment of addresses. Here, an addressing signal is sent from the control circuit 110 via the serial communication lines 155 to the first zone IC 150-1 in a group of zone ICs 150. The first zone IC 150-1 stores an address based on the incoming addressing signal and generates an outgoing addressing signal for outputting to the next zone IC 150-2 via the serial communication line 155. The second zone IC 150-2 similarly receives the addressing signal from the first zone IC 150-1, stores an address based on the incoming addressing signal, and outputs an outgoing addressing signal to the next zone IC 150-3. This process continues through the chain of zone ICs 150. The last zone IC 150-N may optionally send its assigned address back to the control circuit 110 to enable the control circuit 110 to confirm that addresses have been properly assigned. The addressing process may be performed in parallel or sequentially for each group of zone ICs 150.

In an example addressing scheme, each zone IC 150 may receive an address, store the address, increment the address by 1 or by another fixed amount, and send the incremented address as an outgoing addressing signal to the next zone IC 150 in the group. Alternatively, each zone IC 150 may receive the address of the prior zone IC 150, increment the address, store the incremented address, and send the incremented address to the next zone IC 150. In other embodiments, the zone IC 150 may generate an address based on the incoming address signal according to a different function (e.g., decrementing).

After addressing, commands may be sent to the zone ICs 150 based on the addresses. The commands may include dimming commands to control dimming of the LED zones 130 or readback commands that request readback data from a zone IC 150. For dimming commands, the driver circuits 120 receive the dimming data and adjust the driving currents to the corresponding LED zone 130 to achieve the desired brightness. The feedback commands may request information such as channel voltage information, temperature information, light sensing information, status information, fault information, or other data. In response to these commands, the zone ICs 150 may obtain the data from integrated sensors and send the readback data to the control circuit 110.

Commands may be sent to the zone ICs 150 via the shared command line 165 or via the serial communication lines 155 and serially connected zone ICs 150. If commands are sent via the shared command line 165, the targeted zone IC 150 having the specified address processes the command while the other zone ICs 150 may ignore the command. If the commands are sent via the serial communication lines 155, the zone ICs 150 that are not targeted by the command may propagate the command to an adjacent zone IC 150 via the serial communication lines 155 until it reaches the targeted zone IC 150, which processes the command.

In response to a readback command, the targeted zone IC 150 transmit the requested readback data to the control circuit 150 via the serial communication lines 155. For example, upon receiving a command, a targeted zone IC 150 outputs the readback data to an adjacent zone IC 150 via the serial communication lines 155. Each subsequent zone IC 150 receives the readback data and propagates it to the next zone IC 150 in the serial chain until it reaches the control circuit 110. Readback data can propagate through the chain in either direction. For example, the group of driver circuits 110 may propagate the readback data in a forward direction in which each zone IC 150 outputs the readback data to an adjacent zone IC 150 at increasing distance from the control circuit 110 until it reaches the last zone IC 150, which then returns the readback data via the readback line 125. Alternatively, the group of driver circuits 110 may propagate the readback data in a backward direction in which each zone IC 150 outputs the readback data to an adjacent zone IC 150 at decreasing distance from the control circuit 110 until it reaches the control circuit 110. In an embodiment, responses to readback commands may include the address of the targeted zone IC 150 to enable the control circuit 110 to confirm which zone IC 150 provided the response.

In other embodiments, the control circuit 110 may issue a group command that is targeted to the group of zone ICs 150 instead of targeting an individual zone IC 150. In this case, data may be combined by each zone IC 150 as the command and data propagates through the chain to provide a single result to the control circuit 110. For example, in one embodiment, the control circuit 110 may issue a channel sensing command through the serial communication line 155. The first zone IC 150-1 receives the channel voltage sensing command and outputs the command together with its sensed channel voltage to the next zone IC 150-2. The next zone IC 150-2 receives the command and the incoming channel voltage value from the previous zone IC 150-2, senses its own channel voltage, and applies a function to the incoming channel voltage value and the sensed channel voltage to generate an outgoing channel voltage value that it outputs via the serial communication line 155. Here, the function may comprise a minimum function such that the zone IC 150-2 compares the received channel voltage with its sensed channel voltage, and outputs via the serial communication line 155, the lower of the received channel voltage from the prior zone IC 150-2 and the sensed channel voltage from the current driver circuit 220. Alternatively, the function may comprise, for example, a max function, an average function, or other function. This process repeats throughout the chain of zone ICs 150 so that each zone IC 150 outputs a resulting value (e.g., a min, max, or average value) based on the sensed channel voltages detected among the current zone ICs 150 and all prior zone ICs 150. The resulting readback data received by the control circuit 110 represents a function (e.g., a min, max, or average) of each of the detected channel voltages in the group of zone ICs 150. The control circuit 110 can then set a shared supply voltage for the LED zones 130 in each group or another control parameter according to the readback data. For example, by applying a minimum function to obtain the lowest channel voltage in the group, the control circuit 110 can set the supply voltage for the LED zones 130 to a minimum level sufficient to drive the LED zone 230 with the lowest sensed channel voltage.

In another example, a group command may be utilized for temperature sensing. Here, the command and data are propagated through the serial communication chain in each group of zone ICs 150 as described above. At each step, a zone IC 150 receives a temperature from an adjacent zone IC 150, applies a function to the received temperature and its own sensed temperature to generate an outgoing temperature value, and outputs the outgoing temperature to the next zone IC 150. Thus, the control circuit 110 can obtain a function of the sensed temperatures associated with each of the zone ICs 150 in the group. Here, the function may comprise, for example, summing or averaging, or detecting a minimum or maximum value. The control circuit 110 can then adjust the operation of the driver circuits 110 to account for temperature-dependent variations in the outputs of the LED zones 130.

In another example, a group command may be utilized for fault detection. Here, each zone IC 150 may propagate a fault status request command through the chain and set a fault status flag if a fault is detected. The fault status flag may then be propagated to the control circuit 110 to enable the control circuit 110 to detect the faulty zone IC 150 and adjust operation of the driver circuits 110 accordingly. In an embodiment, an address of the faulty zone IC 150 may be sent together with the fault status flag to enable the control circuit 120 to detect the faulty zone IC 150.

The described serial communication protocol can be utilized to calibrate a display device 100. For example, the control circuit 110 can change both the LED current and the on/off duty cycle of the driver circuits 120 in order to change the effective brightness of each LED zone 130 based on received feedback from the zone ICs 150. More specifically, the control circuit 110 may calibrate the driver circuits 120 so that LED zones 130 each output the same brightness in response to the same brightness control signal, despite process variations in the LEDs or associated circuitry that may otherwise cause variations. The calibration process may be performed by measuring light output, channel voltages, temperature, or other data that may affect performances of the LEDs using sensors in the device array 105. The calibration process may be repeated over time (e.g., as the electronic device 100 heats up during operation).

In other embodiments, a group of zone ICs 150 do not necessarily correspond to a row of the device array 105. In alternative embodiments, a group of serially connected zone ICs 150 coupled via serial communication lines 155 may instead correspond to a partial row of the device array 105 or a full or partial column of the device array 105. In another embodiment, a group of zone ICs 150 may correspond to a block of adjacent or non-adjacent zone ICs 150 that may span multiple rows and columns.

In different configurations, each group of zone ICs 150 may include some number of circuits with an integrated driver circuit 120 and LED zone 130 and some number of sensing circuits. For example, the last zone IC 150-N in each row may correspond to a sensing circuit, or various sensor circuits may be interleaved with driver and LED circuits in each group of zone ICs 150.

Figure 2:
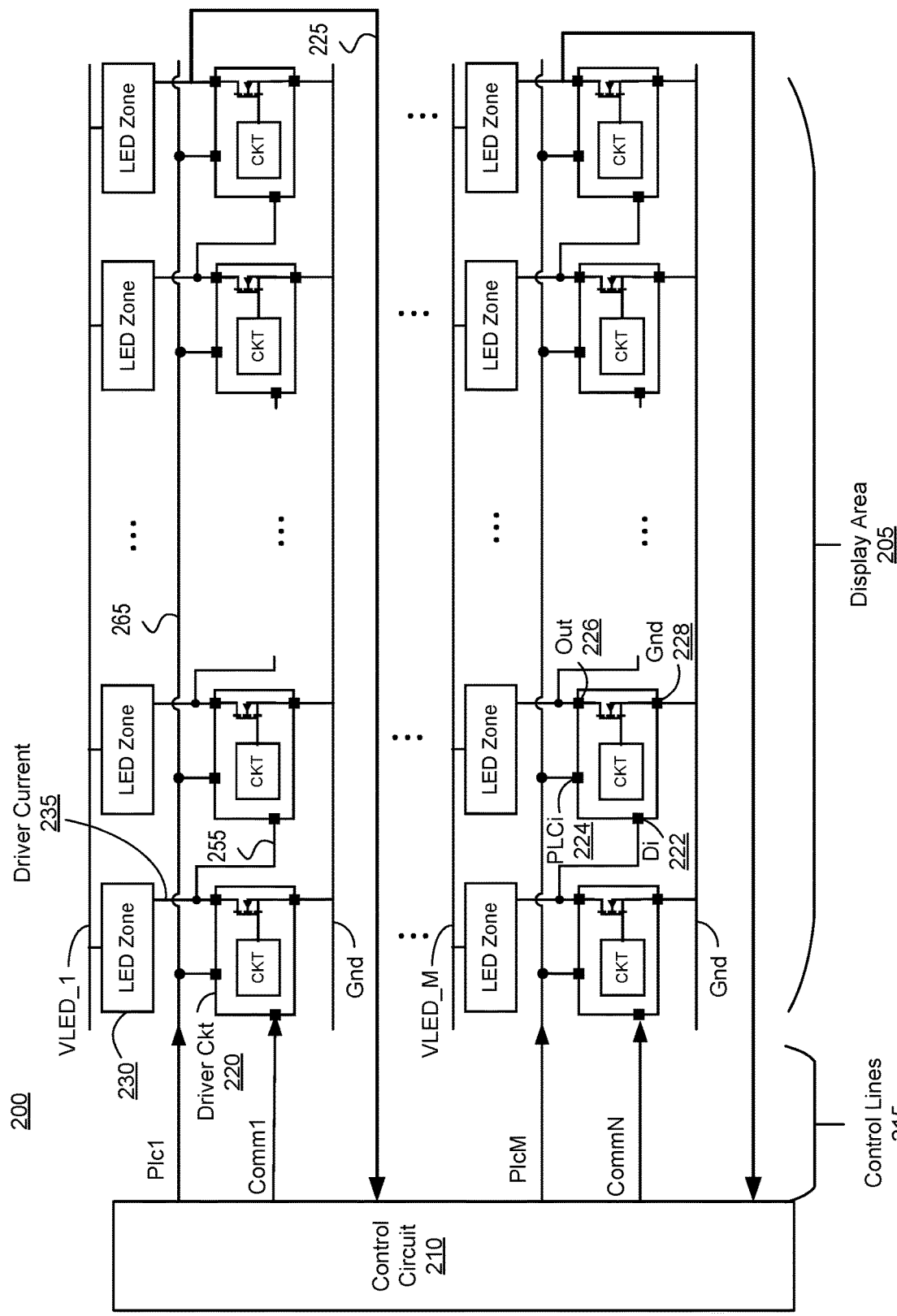
FIG. 2 is a circuit diagram of a display device including a 4-pin architecture for groups of distributed driver circuits that provide feedback via a serial communication chain, according to one embodiment.

FIG. 2 is a circuit diagram of a display device 200 for displaying images or video utilizing the communication protocol described above. A display area 205 comprises an array of pixels for displaying images based on data received from the control circuit 210. In various embodiments, the display area 205 may include LED zones 230, a set of distributed driver circuits 220, power supply lines including VLED lines (e.g., VLED_1, . . . VLED_M) and ground (GND) lines, and various signaling lines including serial communication lines 255 that serially couple the driver circuits 220 to each other and to the control circuit 210, power communication lines 265, and an optional readback line 225. The VLED lines provide power to the LED zones 230 (e.g., by supplying power to the anode of the LEDs in the LED zones 230). The GND lines provide a path to ground for the LED zones 230 and the driver circuits 220. The driver circuits 220 may include one or more integrated sensors. Furthermore, the display device 200 may optionally include one or more dedicated sensor circuits in a serial chain with the driver circuits 220 and that shares the same power communication lines 265 and ground lines 225 of the driver circuits 220.

The driver circuit 220 may include a four-pin configuration. In the four-pin configuration, the driver circuit 220 may include a data input pin (Di) 222, a power line communication input pin (PLCi) 224, one or more output pins (Out) 226, and a ground pin (Gnd) 228. In an embodiment, the output 226 may comprise a set of multiple pins to control multiple channels of the LED zone 230. For example, the output 226 may include 3 pins to control red, green, and blue channels of the LED zones 230.

The ground pin 228 is configured to provide a path to a ground line for the driver circuit 220, which may be common to the corresponding LED zone 230.

The power line communication input pin 224 is configured to receive a power line communication signal from the control circuit 210 via the common power communication lines 265 (e.g., Pwr1, Pwr2, . . . PwrM) for each group. The power line communication signal includes a supply voltage that may be modulated to encode the driver control signal or other control information as digital data. For example, the power line communication signal may encode operating parameter information or control data information for operating the driver circuit 220 and controlling brightness of the LED zones 230. The power communication line 265 may also be utilized to send commands to the driver circuits 220 during the operational mode to request status information such as channel voltage information, temperature information, fault information, or other data. In some embodiments, the power line communication signal supplies a direct current voltage between 3 and 12 volts for the supply voltage. In one embodiment, the power line communication signal may provide a power supply voltage of more than 4.5 volts with a digital data signal having a maximum data rate of up to 2 megahertz (MHz) with a 0.5 peak-to-peak voltage signal.

The data input pin 222 and the output pin 226 are coupled to the serial communication lines 255 to facilitate serial communication to and from the driver circuits 220. The serial communication lines 255 may be used, for example, to assign addresses to the driver circuits 220 or provide readback data to the control circuit 210 in response to commands as described above. As described above, in some embodiments, the data input pin 222 and output pin 226 may facilitate bidirectional communication, in which case data may propagate in the reverse direction from the input pin 222 of one driver circuit 220 to an output pin 226 of an adjacent driver circuit 220. If bidirectional communication is used, the readback line 225 may be optionally omitted. Optionally, the serial communication lines 255 can furthermore be used to provide commands to the driver circuits 220 during the operational mode, instead of or in addition to utilizing the power communication lines 265 for this purpose.

The output pin 226 serves a dual-purpose dependent on the mode of operation. In the addressing mode and during readback operations, the output pin 226 facilitates communications on the serial communication lines 255 as described above. In the operational mode of the display device 200, the output pin 226 is coupled to sink current from a corresponding LED zone 230 to control supply of the driver current 235.

Because the 4-pin driver circuits 220 of FIG. 2 utilize a shared output pin 226 that is used for both serial communication and for driving the LED zones 230, the driver circuits 220 time the serial communications to occur when the LED zones 230 are not actively being driven to avoid interference with the operation of the LED zones 230. Thus, in one embodiment, serial communication is performed only during times when the duty cycles of the driver circuits 220 are not driving the LED zones 230.

In an embodiment, since each of the driver circuits 220 in a group are coupled to the same power communication line 265 providing the brightness control signals, each driver circuit 220 can detect and process the brightness control signals associated with adjacent driver circuits 220 to determine their drive timing. This allows a particular driver circuit 220, k, to determine if the adjacent driver circuit 220

(e.g., k−1 or k+1) is driving its LED zone 230 and the end time of the duty cycle. This enables the driver circuit 220 k to provide data on the serial communication lines 255 during its own off times and the off time of the adjacent driver circuit 220 to which it is communicating.

For example, a data transfer operation is initiated for a driver circuit 220 k via a PLC command on the PLC input pin 224, via a command from the data input pin 222, or via logic internal to the driver circuit 220 (e.g., in response to a detected fault condition or a periodic condition). The data transfer operation may be utilized to read data from the driver circuit 220 k in response to a command, or to enable the driver circuit 220 k to pass a command or data to an adjacent driver circuit (e.g., driver circuit k−1 or k+1). The driver circuit 220 k detects when an adjacent serial communication line 225 is available. For example, if transmitting in the forward direction, the driver circuit 220 k detects when the serial communication line 255 to the driver circuit 220 k+1 is available. In this case, the serial communication line 255 is generally available when the driver circuit 220 k is not driving its corresponding LED zone 230 via its output pin 226. If transmitting in the reverse direction, the driver circuit 220 k detects when the serial communication line 255 to the driver circuit 220 k−1 is available. In this case, the serial communication line 255 to the driver circuit 220 k−1 is available when the driver circuit 220 k−1 is not driving its corresponding LED zone 230 via the output pin 226 of the driver circuit 220 k−1. The driver circuit 220 k may determine the timing of when the output pin 226 of the driver circuit 220 k−1 is available based on the brightness data for the driver circuit 220 k−1 sent via a shared line accessible to the driver circuit 220 k (e.g., via the PLC line 265). The driver circuit 220 k then performs the transfer operation during these detected off times. In an embodiment, the driver circuit 220 k may perform a data transfer over multiple cycles (e.g., multiple periods when the serial communication line is available 255 in between driving the LED zone 230) if there is insufficient time to perform the entire transfer during one cycle. A similar process may be performed by each driver circuit 220 in a chain to serially transfer data to or from the control circuit 210.

In alternative architectures, one or more of the sensor circuits (not shown) may be coupled in series in between adjacent driver circuits 220. The sensing circuits may include similar pin configurations and external connections as the driver circuits 220 except that the output pins 226 of sensor circuits are not coupled to drive an LED zone 230. The sensor circuits may furthermore provide similar capabilities for facilitating serial communications within the group. In a specific example, the last element in each row may comprise a sensor circuit. In some embodiments where the readback line 225 is omitted, the last element in each row may comprise a 3-pin sensor device instead of a 4-pin device because separate input and output pins are not needed.

Figure 3:
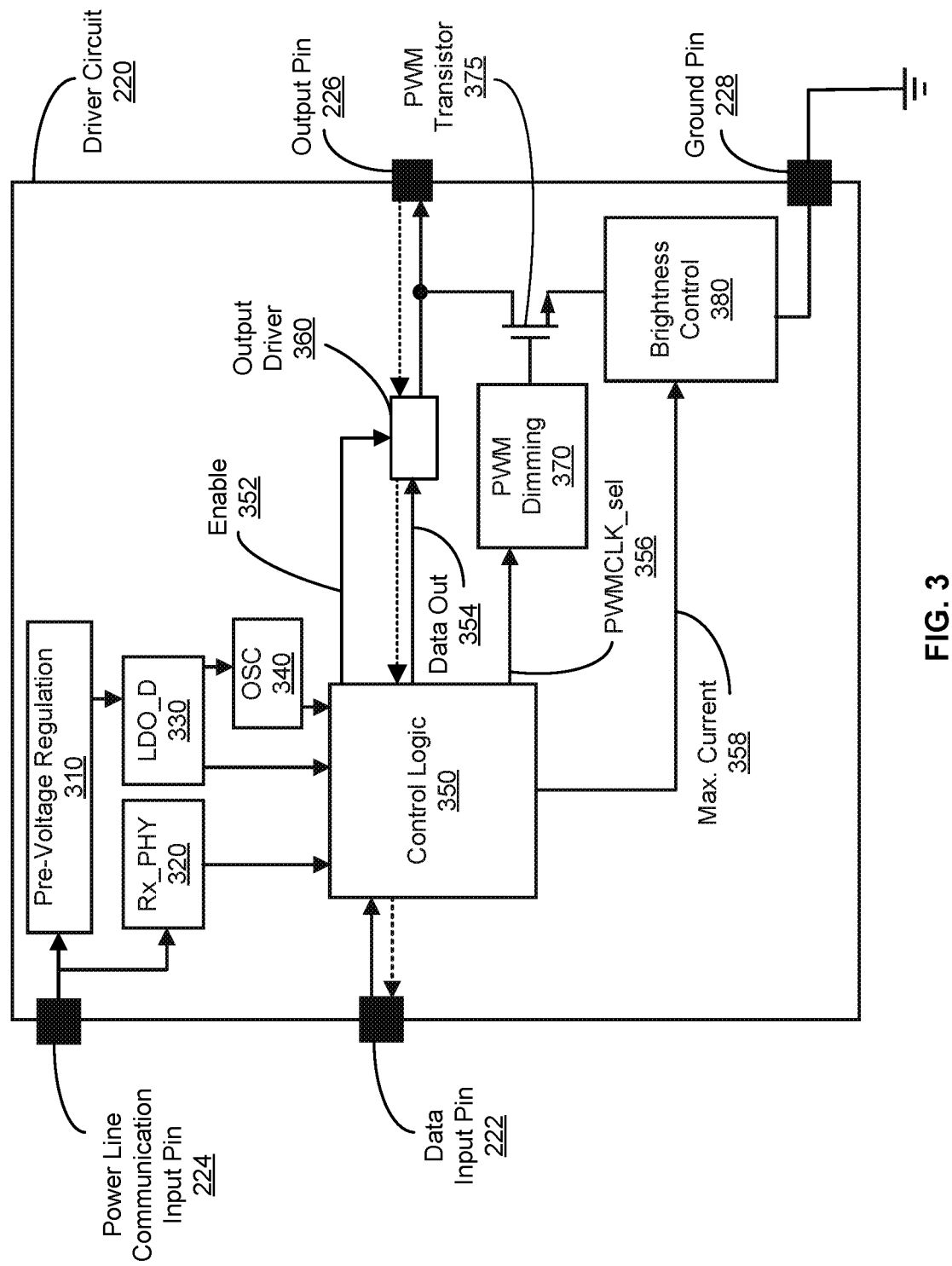
FIG. 3 is a circuit diagram of a 4-pin architecture of a driver circuit for a display device, according to one embodiment.

FIG. 3 is an example circuit diagram of the driver circuit 220, according to one embodiment. The driver circuit 220 may include a voltage pre-regulation circuit 310, an Rx_PHY 320, a low-dropout regulator LDO_D 330, an oscillator OSC 340, control logic 350, an output driver 360, a pulse width modulation (PWM) dimming circuit 370, a transistor 375, and a brightness control circuit 380. In various embodiments, the driver circuit 220 may include additional, fewer, or different components.

The Rx_PHY 320 is a physical layer that demodulates the PLC data from the PLC signal and provides the corresponding digital data to the control logic 350. In an example embodiment, the Rx_PHY 320 provides a connection with a maximum bandwidth of 2 MHz with a cascade of 36 stages.

The voltage pre-regulation circuit 310 performs pre-regulation of the power line communication signal. In one embodiment, the voltage pre-regulation circuit 310 comprises a first order RC filter followed by a source follower. The voltage pre-regulator 310 may optionally be omitted and the PLC signal may instead pass directly to the LDO-D 330. The power line communication signal is also provided to the Rx_PHY 320. The pre-regulated supply voltage is provided to the LDO_D 330. The LDO_D 330 converts the pre-regulated supply voltage into a steady direct current voltage (which may be lower than the pre-regulated supply voltage) used to power the oscillator OSC 340 and control logic 350. In an example embodiment, the steady direct current voltage may be 1.8 volts. The oscillator OSC 340 provides a clock signal to the control logic 350.

The control logic 350 receives the driver control signal from the Rx_PHY 320, the direct current voltage from the LDO_D 330, and the clock signal from the oscillator OSC 340. The control logic 350 may also receive digital data from the data input pin 222 and output an enable signal 352, a data output signal 354, a PWM clock selection signal PWMCLK_sel 356, and a maximum current signal Max. Current 358. During the addressing mode or when the driver circuit 220 outputs or receives command or data signals during the operational mode, the control logic 350 activates the enable signal 352 to enable the output driver 360. The output driver 360 buffers the output signal 354 to the output pin 226 when the enable signal 352 is activated. When the output driver 360 is active, the control logic 350 may control the PWM dimming circuit 370 to turn off the transistor 375 to effectively block the current path from the LEDs.

When driving the LED zones 230, the control logic deactivates the enable signal 352 and the driver 360 is tri-stated to effectively decouple it from the output pin 226. The PWM clock selection signal PWMCLK_sel 356 specifies a duty cycle for controlling PWM dimming by the PWM dimming circuit 370. Based on the selected duty cycle, the PWM dimming circuit 370 controls timing of an on-state and an off-state of the transistor 375. During the on-state of the transistor 375, a current path is established from the output pin 226 (coupled to the LED zones 230) to the ground pin 228 through the transistor 375 and the brightness control circuit 380 to sink the driver current through the LEDs of the LEDs zones 230. During an off-state of the transistor 375, the current path is interrupted to block current from flowing through the LED zones 230. The brightness control circuit 380 receives the maximum current signal Max. Current 358 from the control logic 350 and controls the current level that flows through the LEDs (from the output pin 226 to the ground pin 228) when the transistor 375 is in the on-state. During the operational mode, the control logic 350 controls the duty cycle of the PWM dimming circuit 370 and the maximum current Max. Current 358 of the brightness control circuit 380 to set the LED zones 230 to the desired brightness.

As described above, the data input pin 222 and the output pin 226 may optionally be bidirectional. In this case, the output driver 360 may be a bidirectional driver that can also receive data or commands from the output pin 226 when the driver is not driving the LED zone 230 and the control logic 350 may output data or commands to the data input pin 222.

As described above, alternative embodiments may include multiple output pins 226 for driving multiple channels of the LED zones 230 (e.g., 3 output pins 226 to drive three channels of LEDs). In this case, the driver circuit 220 may include parallel transistors 375 and associated control lines for driving each channel.

Figure 4:
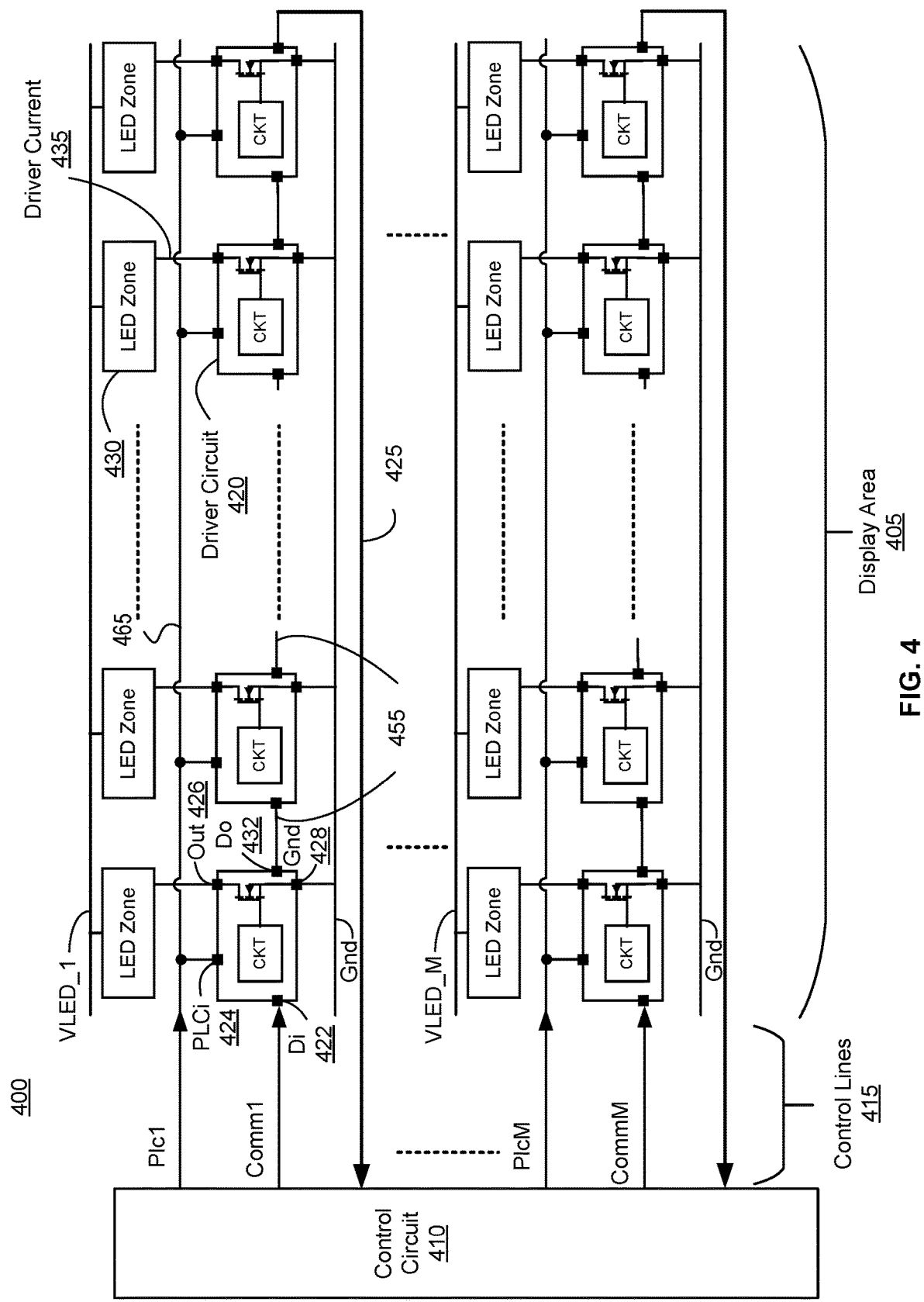
FIG. 4 is a circuit diagram of a display device including a first embodiment of a 5-pin architecture for groups of distributed driver circuits that provide feedback via a serial communication chain, according to one embodiment.

FIG. 4 illustrates an alternative embodiment of a display device 400 including a control circuit 410, a set of control lines 415, and a display area 405. The display area 405 includes an array of driver circuits 420 for driving respective LED zones 430 via a driver current 435. The driver circuits 420 each include a PLC pin 424, a data input pin 422, an LED driving output pin 426, a data output pin 432, and a ground pin 428. Serial communication lines 455 couple the control circuit 410 to a data input pin 422 of the first driver circuit 420 in a group of driver circuits 420 and couple serially between the data output pin 432 and the data input pin 432 of adjacent driver circuits 420. A readback line 425 optionally couples the data output pin 432 of the last driver circuit 420 in the group to the control circuit 410. A power communication line 465 couples to a power communication pin 424 of each driver circuit 420 in a group. Furthermore, a ground line couples to ground pins 428 of each driver circuit 420 in the group.

The display device 400 is similar to the display device 200 of FIG. 2, but the driver circuits 420 include separate LED driving output pins 426 and data output pins (Do) 432 instead of a shared output pin 226. This embodiment enables the Di/Do pins 422/432 to be used as dedicated data transfer pins and enable a driver circuit 420 to perform data transfers concurrently with the driver circuit 420 actively driving an LED zone 430. Thus, the driver circuits 420 of FIG. 4 can continuously transfer data using the serial chain independently of the LED dimming cycles. Furthermore, the serial communication lines 455 can be used to send commands from the control circuit 410 (instead of relying on the power communication line 465). For example, in one communication scheme, the power communication line 465 is used to send brightness data to the driver circuits 420 for driving the LED zones 430 while other commands for obtaining various readback data (e.g., sensor data) is sent via the serial communication lines 455.

In this implementation, the control circuit 410 can send various commands to the driver circuits 420 via a serial communication line 455 coupled to the data input (Di) pin of the first driver circuit 420 in the chain. If the command is a targeted command, the first driver circuit 420 in the chain determines if the target address matches its address. If it does not match, the driver circuit 420 passes the command to the next driver circuit via the serial communication lines 455. Otherwise, the driver circuit 420 sends the readback data via the serial communication lines 455. The command and/or feedback data may then similarly propagate through the chain of driver circuits 420, with the final driver circuit 420 in the chain providing feedback data back to the control circuit 410 via the readback line 425. Alternatively, data may be propagated backwards through the chain (from the Di pin 422 of one driver circuit 420 to the Do pin 432 of the previous driver circuit 420). In this case, the display device 400 does not necessarily include the readback line 425. Commands requesting group data (e.g., the lowest channel voltage in the group or combined temperature in the group) may similarly be processed through the serial communication chain in the same manner described above. For example, each driver circuit 420 may combine a received temperature with its own sensed temperature and a combined temperature value as described above. Or each driver circuit 420 may compare a received channel voltage with its own sensed channel voltage and send the lower channel voltage through the serial chain as described above.

As described above with respect to FIG. 2, one or more sensor circuits (not shown) may be coupled in series in between adjacent driver circuits 420. The sensor circuits may include similar pin configurations and external connections as the driver circuits 420 except that they do not drive LED zones 230 and the LED driving output pins 426 may be omitted in the sensor circuits. The sensor circuits may provide similar capabilities for facilitating serial communications within the group as described above.

Figure 5:
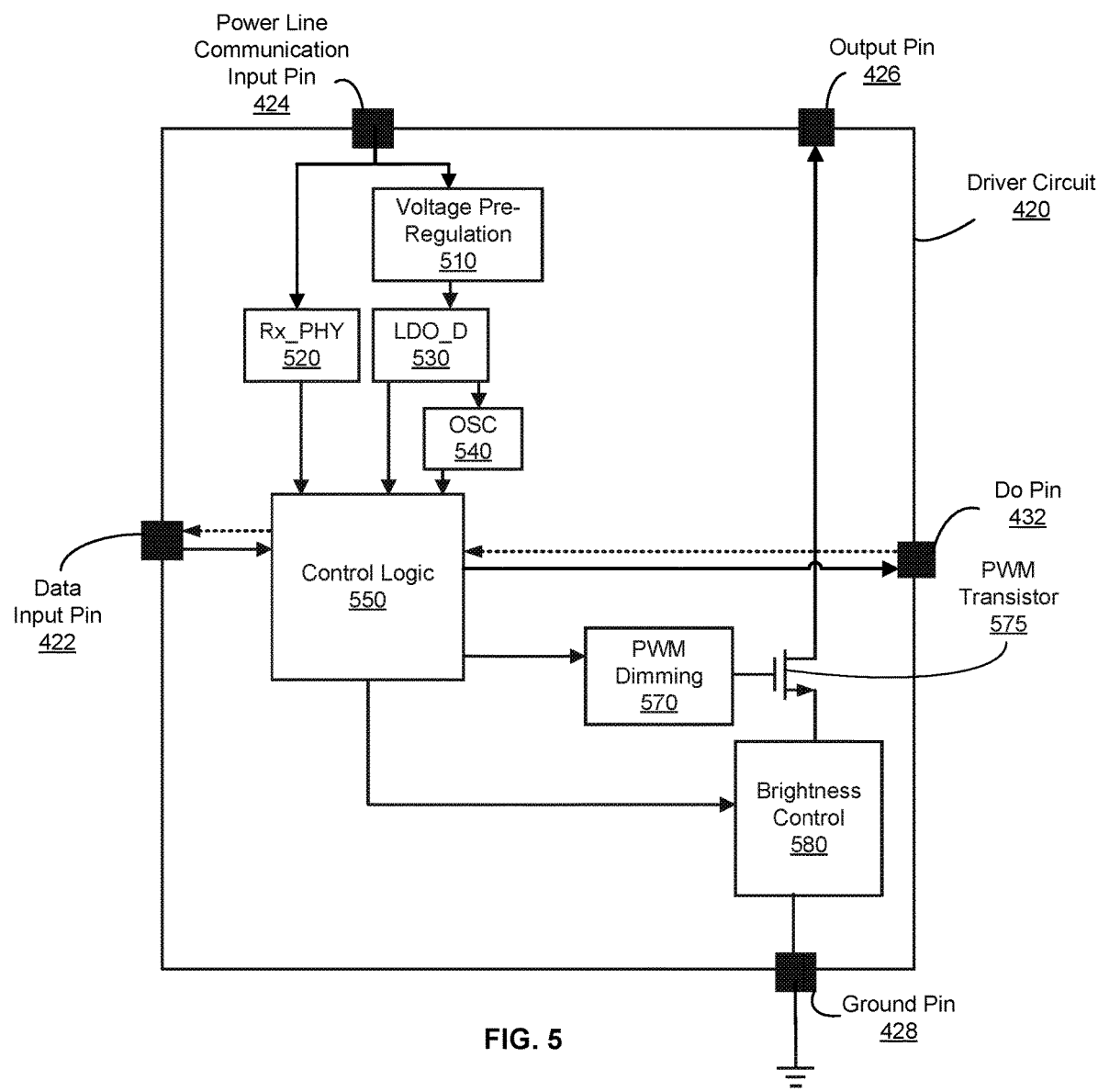
FIG. 5 is a circuit diagram of the first embodiment of the 5-pin architecture of a driver circuit for a display device, according to one embodiment.

FIG. 5 illustrates an example embodiment of a driver circuit 420 that includes a dedicated data output pin 432 and LED driving output pin 426 in the 5-pin configuration described above. The driver circuit 420 includes a voltage pre-regulation circuit 510, an Rx_Phy 520, a low dropout regulator 530, an oscillator 540 control logic 550, a PWM dimming controller 570, a PWM transistor 575, and a brightness control circuit 580. These components operate similarly to the analogous components in the driver circuit 220 of FIG. 3, except the output driver 360 and corresponding enable logic may be omitted and the control logic 550 may instead output directly to the data output pin 432. Based on this architecture, the control logic 550 can communicate via the data output pin 432 while the driver circuit 420 concurrently sinks current via the LED driving output pin 426 to drive the LED zones 430. Like the driver circuit 220 of FIG. 2, the driver circuit 420 may optionally provide bidirectional communication between the data input pin 422 and the data output pin 432.

Figure 6:
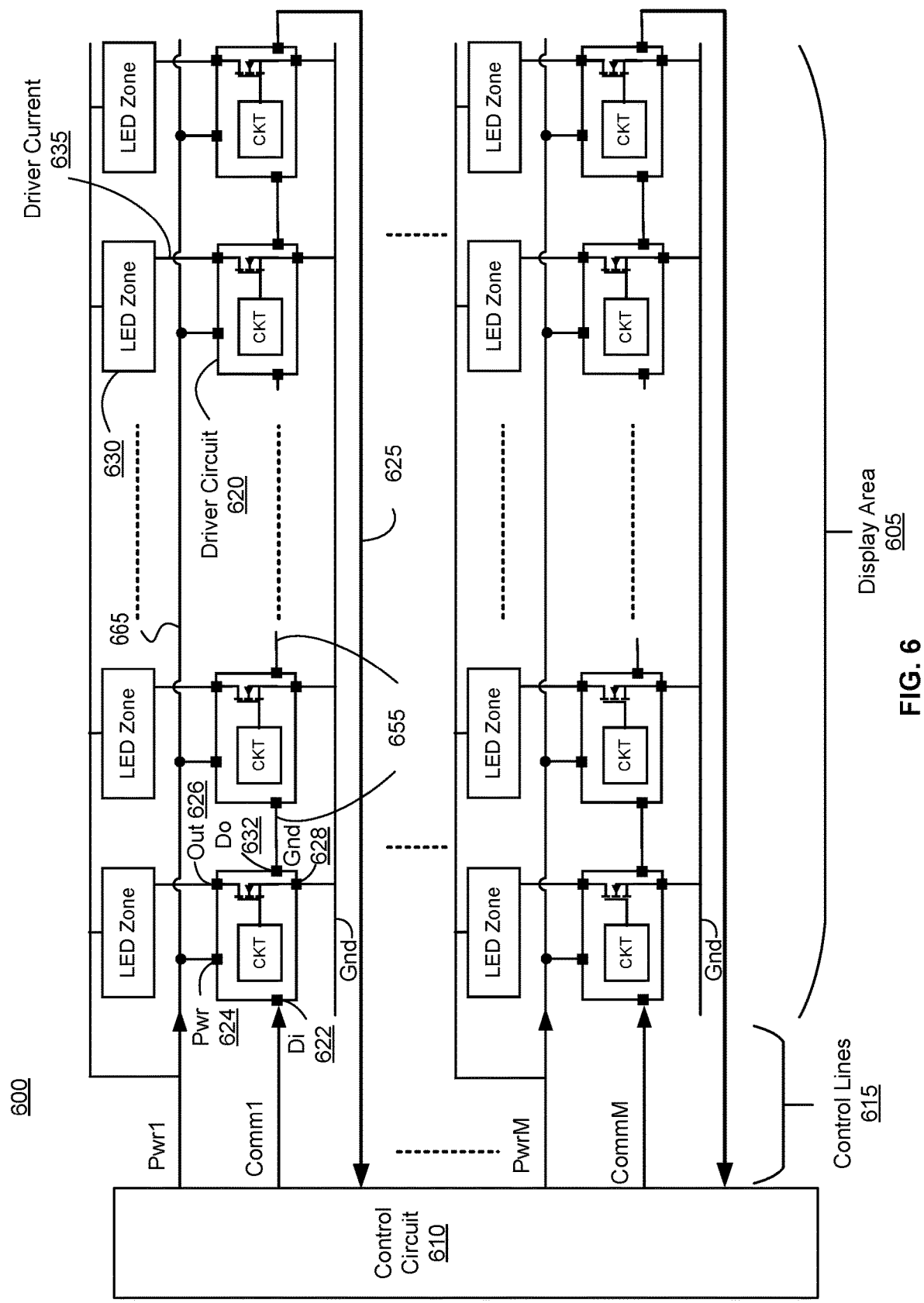
FIG. 6 is a circuit diagram of a display device including a second embodiment of a 5-pin architecture for groups of distributed driver circuits that provide feedback via a serial communication chain, according to one embodiment.

FIG. 6 illustrates another embodiment of a display device 600 including a control circuit 610, a set of control lines 615, and a display area 605. The display area 605 includes an array of driver circuits 620 for driving respective LED zones 630 via a driver current 635. The driver circuits 620 each include a power pin 624, a data input pin 622, an LED driving output pin 626, a data output pin 632, and a ground pin 628. Serial communication lines 655 couple the control circuit 610 to a data input pin 622 of the first driver circuit 620 in a group of driver circuits 620 and couple serially between the data output pin 632 and the data input pin 622 of adjacent driver circuits 620. A readback line 625 optionally couples the data output pin 632 of the last driver circuit 620 in the group to the control circuit 610. A power line 665 couples to a power pin 624 of each driver circuit 620 in a group. Furthermore, a ground line couples to ground pins 628 of each driver circuit 620 in the group.

The display device 600 of FIG. 6 is similar to the display device 400 of FIG. 4 except that it does not use power line communication and instead includes a dedicated power line 665 that provides power to both the driver circuits 620 and the LED zones 630 within a group, but does not provide modulated data. Thus, in this embodiment, all commands (including brightness data for driving the LED zones 630 and readback commands) are sent through the serial communication lines 655 and the serially connected driver circuits 620. The driver circuits 620 may optionally obtain addresses during the addressing mode as described above via the serial communication lines 655. In other embodiments, the driver circuits 620 in this embodiment are not necessarily individually addressable. In this case, the driver circuits 620 operate as clock-less shift registers to serially shift data through the chain of driver circuits 620. In one embodiment, Bit-Phase Mark encoding is used to extract a clock and shift data into the driver circuits 620. The data may also be shifted all the way through each of the driver circuits 620 in the serial chain and then shifted out again (e.g., in the reverse direction or in the forward direction using the readback line 625) to be used for error detection.

In this embodiment, data is written to all the driver circuits 620 each time the brightness control signal changes.

In an embodiment, each driver circuit 620 includes a register that holds information transferred to it from the previous driver circuit 620 in the chain. At the input pin 622, a Bit-Phase-Mark to Binary converter converts the input signal from a Bit-Phase-Mark encoding to a binary encoding. At the data output pin 632 of each driver circuit 620, a Binary to Bit-Phase-Mark converter converts the data back to a Bit-Phase-Mark encoding for transmission via the serial communication lines 655. In other embodiments, different encodings may be used.

If addresses are individually assigned, each driver circuit 620 examines packets that arrive via the serial communication lines 655 to determine if the address matches its stored address. If the addresses match, then the driver circuit 620 executes the command coupled with that address. For example, if the command is a brightness setting then the driver circuit 620 adjusts the LED brightness. If the command is a temperature request, then the driver circuit outputs its temperature (and its corresponding address) with the proper command to indicate that the data should be passed through the remaining driver circuits 620 back to the control circuit 610. If the incoming address does not match the address of the driver circuit 620, then the command coupled with its intended address is passed onto the next driver circuit 620 via the serial communication lines 655.

Figure 7:
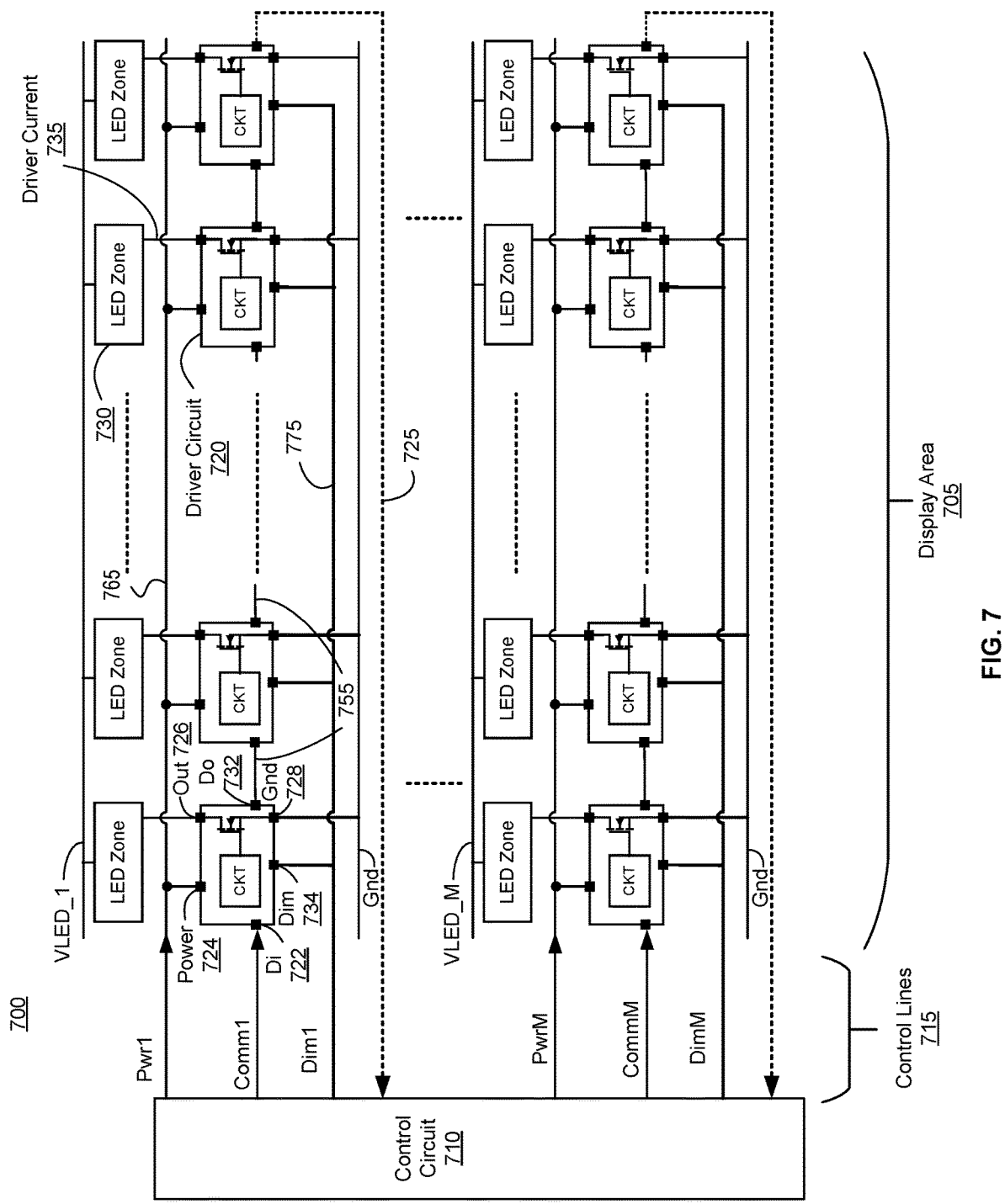
FIG. 7 is a circuit diagram of a display device including a 6-pin architecture for distributed driver circuits that provide feedback via a serial communication chain, according to one embodiment.

FIG. 7 illustrates another alternative embodiment of a display device 700 including a control circuit 710, a set of control lines 715, and a display area 705. The display area 705 includes an array of driver circuits 720 for driving respective LED zones 730 via a driver current 735. The driver circuits 720 each include a power pin 724, a data input pin 722, an LED driving output pin 726, a data output pin 732, a dimming input pin 734, and a ground pin 728. Serial communication lines 755 couple the control circuit 710 to a data input pin 722 of the first driver circuit 720 in a group of driver circuits 720 and couple serially between the data output pin 732 and the data input pin 722 of adjacent driver circuits 720. A readback line 725 optionally couples the data output pin 732 of the last driver circuit 720 in the group to the control circuit 710. Each driver circuit 720 in a group is furthermore coupled in parallel to a shared power line 765 (coupled to respective power pins 724 of each driver circuit 720), ground lines Gnd (coupled to respective ground pins 728), and dimming control line 775 (coupled to respective dimming input pins 734).

The display device 700 is similar to the display device 400 of FIG. 4 except that instead of using power line communication, a dedicated dimming control line 775 provides commands or data to the driver circuit 720 (e.g., LED driving data such as brightness information or readback commands) via respective dimming input pins 734 and a separate power line provides power via respective power input pins 724 (without modulated data). Here, the serial communication lines 755 may be used during the addressing phase as described above. Furthermore, the serial communication lines 755 may be utilized to provide readback data in response to commands received via the dimming input pins 734. As described above, the serial communication lines 755 may be unidirectional (with data returning to the control circuit 710 via a readback line 725) or bidirectional (with readback data returning to the control circuit 710 via the serial communication lines 755 in the reverse direction). In some embodiments, commands or data may instead be sent to the driver circuits 720 via the serial communication lines 755 instead of or in addition to the dimming control line 775.

As described for previous embodiments, one or more sensor circuits (not shown) may be coupled in series in between adjacent driver circuits 720. The sensor circuits may include similar pin configurations and external connections as the driver circuits 720 except that the sensor circuits do not drive LED zones 730 and the LED driving output pins 426 may be omitted in the sensor circuits. In other embodiments, if readback commands are sent through the serial communication lines 755, the dimming input pin 734 may also be omitted in the sensing circuits. The sensing circuits may provide similar capabilities for facilitating serial communications within the group as described above.

Figure 8:
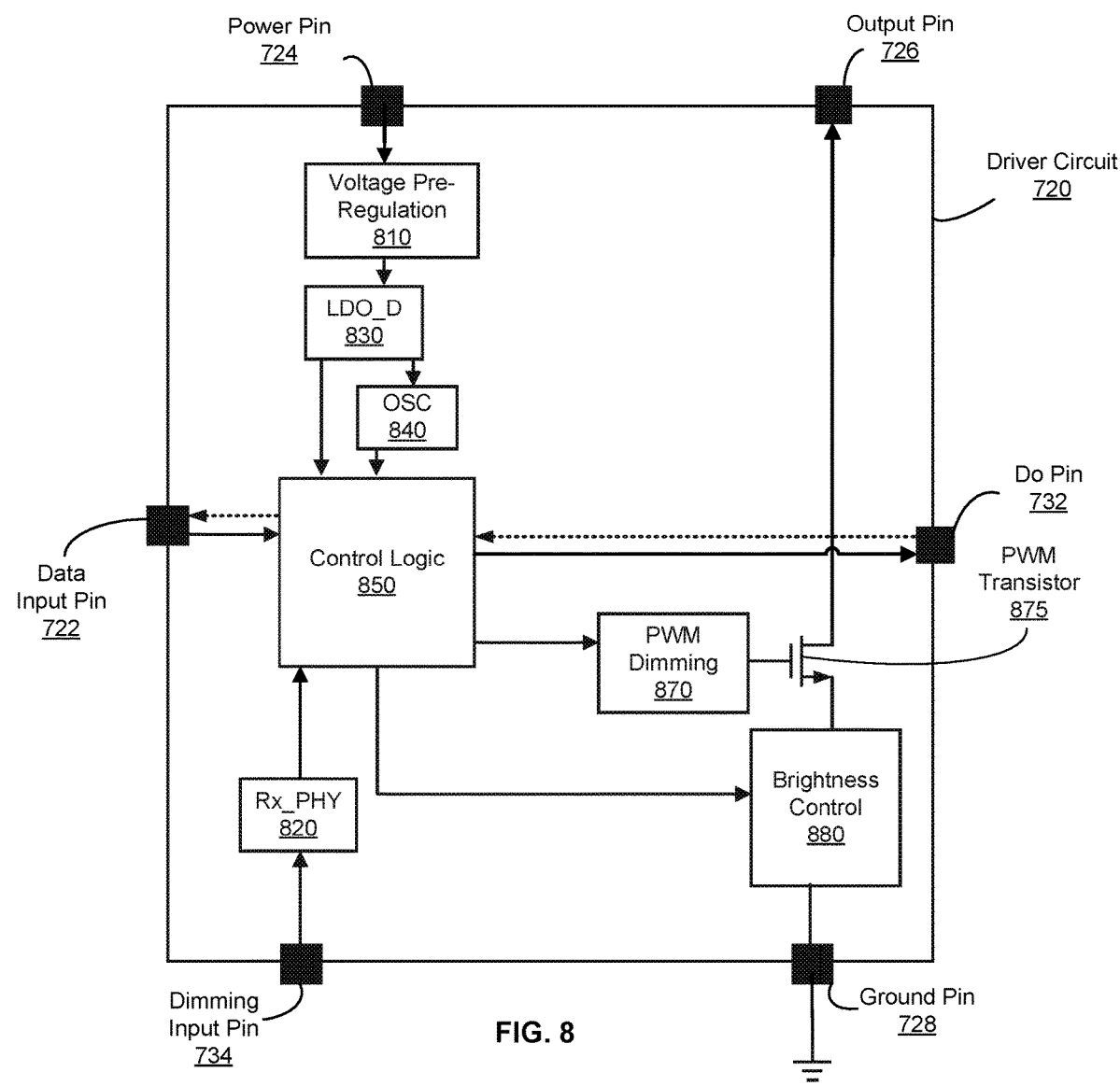
FIG. 8 is a circuit diagram of a 6-pin architecture of a driver circuit for a display device, according to one embodiment.

FIG. 8 illustrates an example embodiment of a driver circuit 720. The driver circuit 720 includes a voltage pre-regulation circuit 810, an Rx_Phy 820, a low dropout regulator 830, an oscillator 840 control logic 850, a PWM dimming controller 870, a PWM transistor 875, and a brightness control circuit 880. These components operate similarly to the analogous components in the driver circuit 420 of FIG. 5 except the Rx_Phy 820 is coupled to receive commands via the dimming input pin 734 instead of via power line communication. The power pin 724 supplies power without modulated data.

Figure 9:
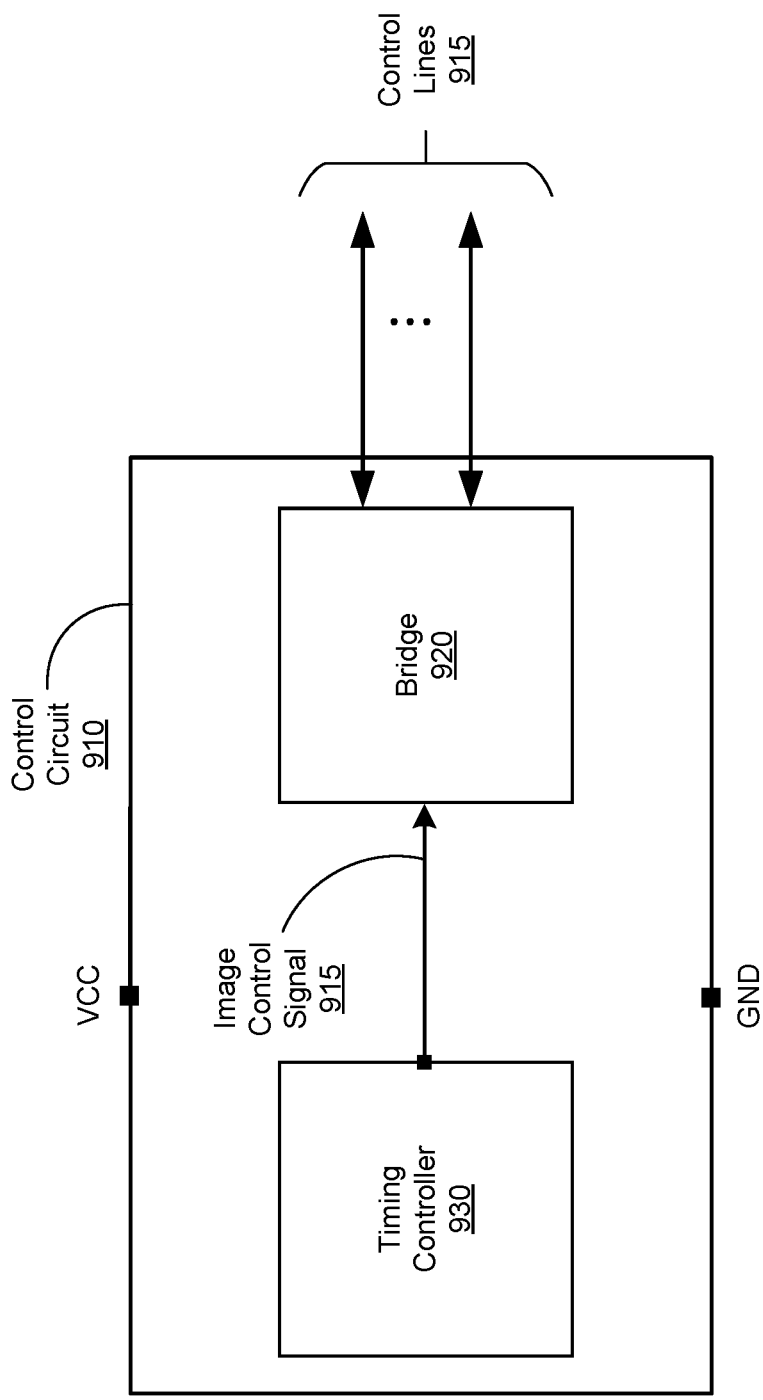
FIG. 9 is a block diagram of a control circuit for a display device, according to one embodiment.

FIG. 9 is an example circuit diagram of a control circuit 910 that may correspond to the control circuits 110, 210, 410, 610, or 710 of any of the preceding embodiments. The control circuit 910 controls operation of the display device based on signals communicated on control lines 915 as described above. The control circuit 910 may include a timing controller 930 and a bridge 920. The control circuit 910 may control the display device using either active matrix (AM) or passive matrix (PM) driving methods.

The timing controller 930 generates an image control signal 915 indicating values for driving pixels of the display device and timing for driving the pixels. For example, the timing controller 930 controls timing of image or video frames and controls timing of driving each of the LED zones within an image or video frame. Furthermore, the timing controller 930 controls the brightness for driving each of the LED zones during a given image or video frame. The image control signal 915 is provided by the timing controller 930 to the bridge 920.

The bridge 920 translates the image control signal 915 to generate the various signals to the device array including, for example, power communication signals, dimming signals, command signals, or other signals described in any of the preceding embodiments. Furthermore, the bridge 920 may receive feedback signals from the device array via the control lines 915 and adjust operation accordingly as described in any of the preceding embodiments.

Figure 10A:
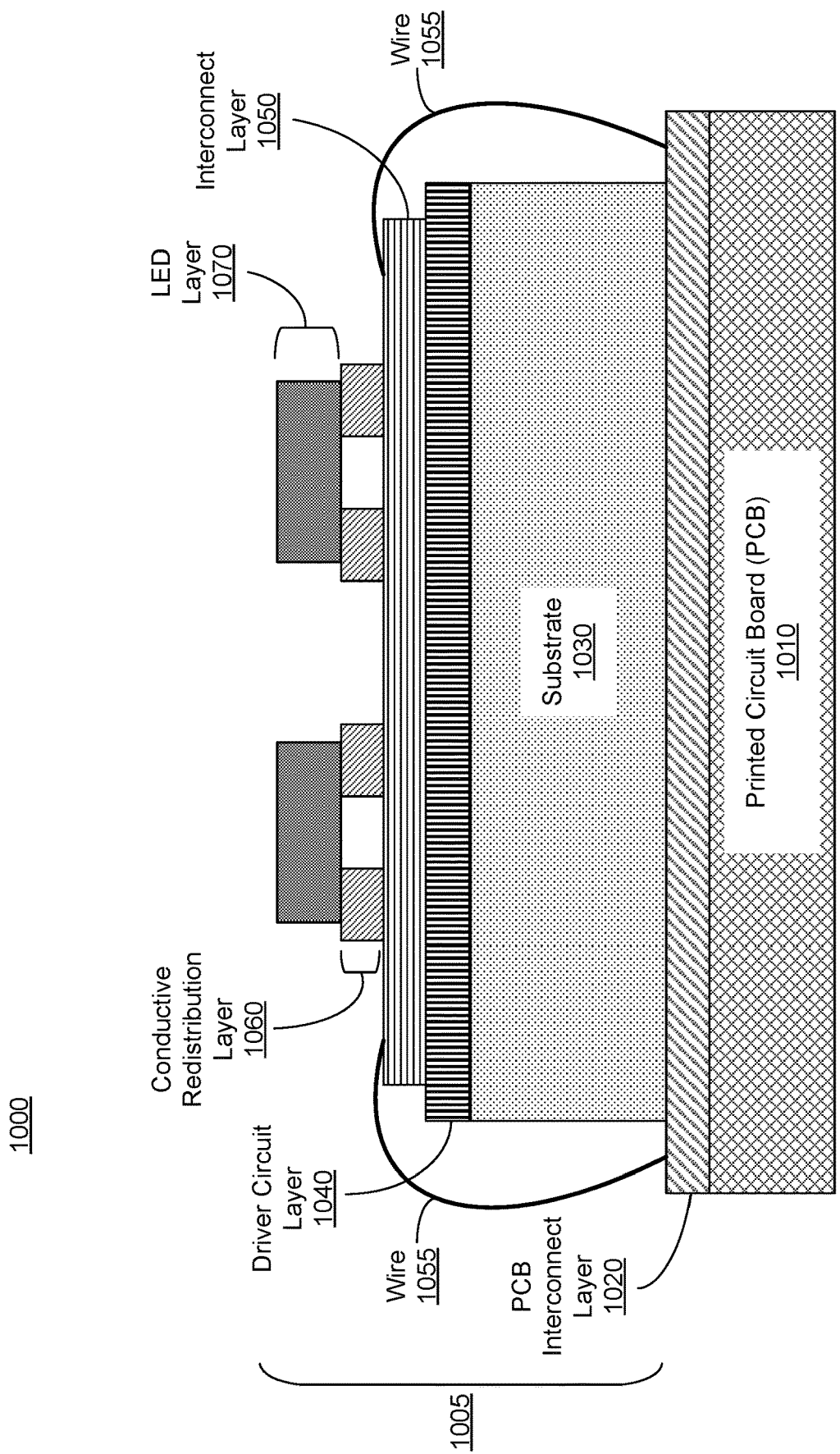
FIG. 10A is a cross sectional view of a first embodiment of an LED and driver circuit that may be utilized in a display device.

FIG. 10A is a cross sectional view of a first embodiment of a zone IC 1000 that includes an integrated LED and driver circuit 1005 in a single package. In the example shown in FIG. 10A, the circuit 1000 includes a printed circuit board (PCB) 1010, a PCB interconnect layer 1020, and the integrated LED and driver circuit 1005 which comprises a substrate 1030, a driver circuit layer 1040, an interconnect layer 1050, a conductive redistribution layer 1060, and an LED layer 1070. Bonded wires 1055 may be included for connections between the PCB interconnect layer 1020 and the integrated LED and driver circuit 1005. The PCB 1010 comprises a support board for mounting the integrated LED and driver circuit 1005, the control circuit and various other supporting electronics. The PCB 1010 may include internal electrical traces and/or vias that provide electrical connections between the electronics. A PCB interconnect layer 1020 may be formed on a surface of the PCB 1010. The PCB interconnect layer 1020 includes pads for mounting the various electronics and traces for connecting between them.

The integrated LED and driver circuit 1005 includes a substrate 1030 that is mountable on a surface of the PCB interconnect layer 1020. The substrate 1030 may be, e.g., a silicon (Si) substrate. In other embodiments, the substrate 1030 may include various materials, such as gallium arsenide (GaAs), indium phosphide (InP), gallium nitride (GaN), AlN, sapphire, silicon carbide (SiC), or the like.

A driver circuit layer 1040 may be fabricated on a surface of the substrate 1030 using silicon transistor processes (e.g., BCD processing) or other transistor processes. The driver circuit layer 1040 may include one or more driver circuits (e.g., a single driver circuit or a group of driver circuits arranged in an array). An interconnect layer 1050 may be formed on a surface of the driver circuit layer 1040. The interconnect layer 1050 may include one or more metal or metal alloy materials, such as Al, Ag, Au, Pt, Ti, Cu, or any combination thereof. The interconnect layer 1050 may include electrical traces to electrically connect the driver circuits in the driver circuit layer 1040 to wire bonds 1055, which are in turn connected to the control circuit on the PCB 1010. In an embodiment, each wire bond 1055 provides an electrical connection to the control circuit in accordance with the connections described in any of the preceding embodiments.

In an embodiment, the interconnect layer 1050 is not necessarily distinct from the driver circuit layer 1040 and these layers 1040, 1050 may be formed in a single process in which the interconnect layer 1050 represents a top surface of the driver layer 1040.

The conductive redistribution layer 1060 may be formed on a surface of the interconnect layer 1050. The conductive redistribution layer 1060 may include a metallic grid made of a conductive material, such as Cu, Ag, Au, Al, or the like. An LED layer 1070 includes LEDs that are on a surface of the conductive redistribution layer 1060. The LED layer 1070 may include arrays of LEDs arranged into the LED zones as described above. The conductive redistribution layer 1060 provides an electrical connection between the LEDs in the LED layer 1070 and the one or more driver circuits in the driver circuit layer 1040 for supplying the driver current and provides a mechanical connection securing the LEDs over the substrate 1030 such that the LED layer 1070 and the conductive redistribution layer 1060 are vertically stacked over the driver circuit layer 1040.

Thus, in the illustrated circuit 1000, the one or more driver circuits and the LED zones including the LEDs are integrated in a single package including a substrate 1030 with the LEDs in an LED layer 1070 stacked over the driver circuits in the driver circuit layer 1040. By stacking the LED layer 1070 over the driver circuit layer 1040 in this manner, the driver circuits can be distributed in the display area of a display device.

Figure 10B:
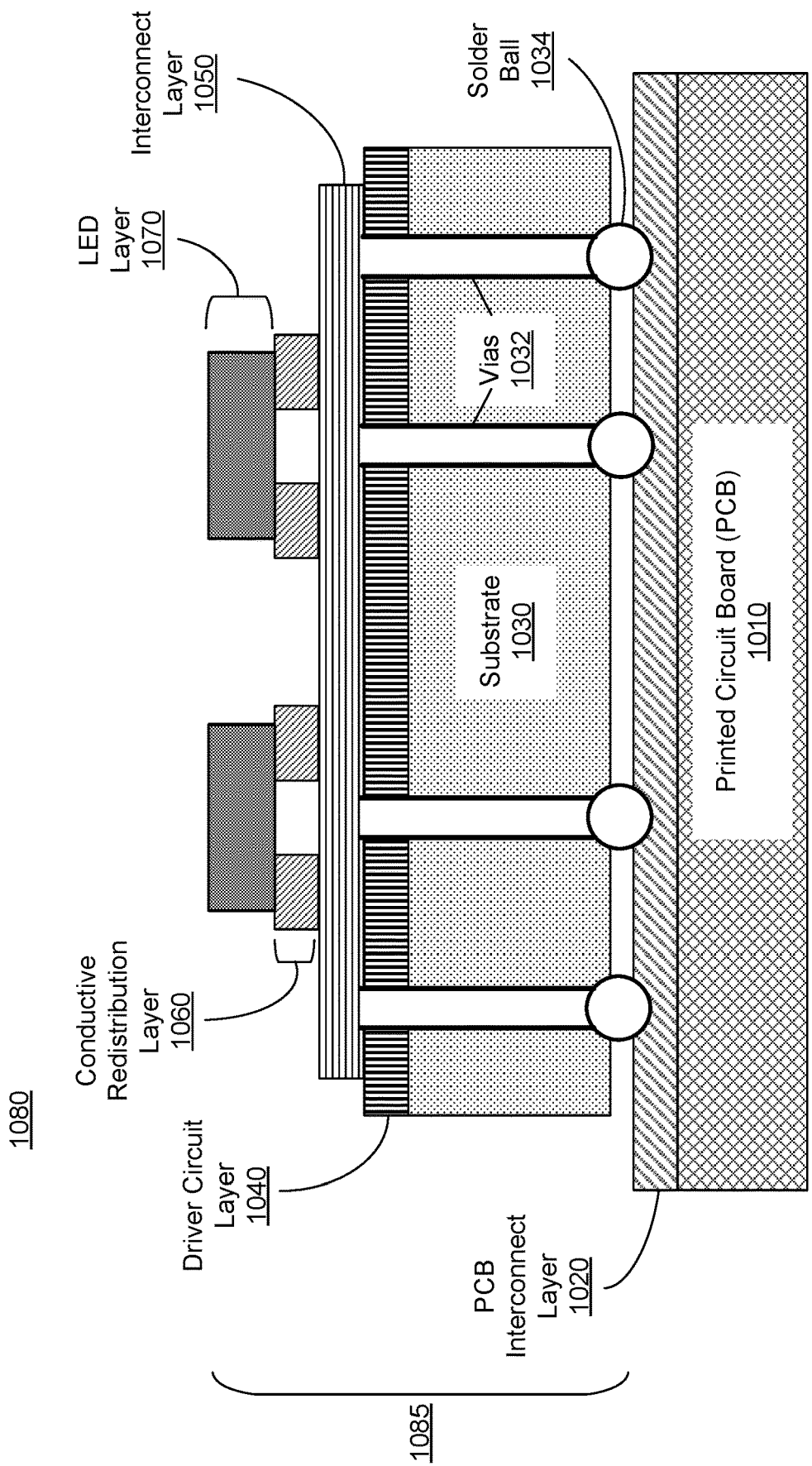
FIG. 10B is a cross sectional view of a second embodiment of an LED and driver circuit that may be utilized in a display device.

FIG. 10B is a cross sectional view of a second embodiment of a display device 1080 including an integrated LED and driver circuit 1085, according to one embodiment. The device 1080 is substantially similar to the device 1000 described in FIG. 10A but utilizes vias 1032 and corresponding connected solder balls 1034 to make electrical connections between the driver circuit layer 1040 and the PCB 1010 instead of the wires 1055. Here, the vias 1032 are plated vertical electrical connections that pass completely through the substrate layer 1030. In one embodiment, the substrate layer 1030 is a Si substrate and the through-chip vias 1032 are Through Silicon Vias (TSVs). The through-chip vias 1032 are etched into and through the substrate layer 1030 during fabrication and may be filled with a metal, such as tungsten (W), copper (C), or other conductive material. The solder balls 1034 comprise a conductive material that provide an electrical and mechanical connection to the plating of the vias 1032 and electrical traces on the PCB interconnect layer 1020. In one embodiment, each via 1032 provides an electrical connection for providing signals such as the driver control signal from the control circuit on the PCB 1010 to a group of driver circuits on the driver circuit layer 1040. The vias 1032 may also provide connections for the incoming and outgoing addressing signals, the supply voltage (e.g., VLED) to the LEDs in a LED zone on the LED layer 1070, and a path to a circuit ground (GND).

Figure 10C:
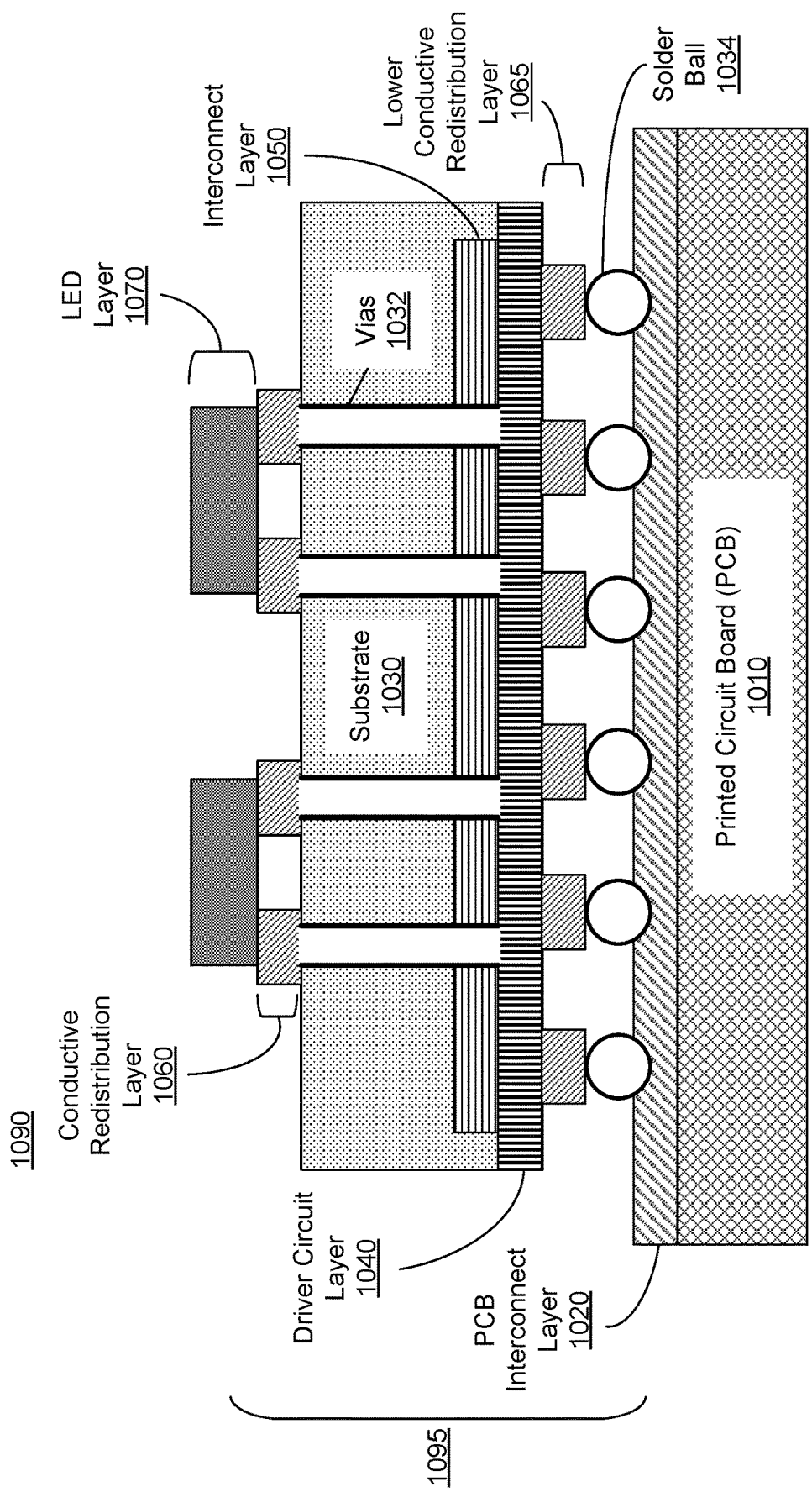
FIG. 10C is a cross sectional view of a third embodiment of an LED and driver circuit that may be utilized in a display device.

FIG. 10C is a cross sectional view of a third embodiment of a display device 1090 including an integrated LED and driver circuit 1095. The device 1090 is substantially similar to the device 1080 described in FIG. 10B but includes the driver circuit layer 1040 and interconnect layer 1050 on the opposite side of the substrate 1030 from the conductive redistribution layer 1060 and the LED layer 1070. In this embodiment, the interconnect layer 1050 and the driver circuit layer 1040 are electrically connected to the PCB 1010 via a lower conductive redistribution layer 1065 and solder balls 1034. The lower conductive redistribution layer 1065 and solder balls 1034 provide mechanical and electrical connections (e.g., for the driver control signals) between the driver circuit layer 1040 and the PCB interconnect layer 1020. The driver circuit layer 1040 and interconnect layer 1050 are electrically connected to the conductive redistribution layer 1060 and the LEDs of the LED layer 1070 via one or more plated vias 1032 through the substrate 1030. The one or more vias 1032 seen in FIG. 10C may be utilized to provide the driver currents from the driver circuits in the driver circuit layer 1040 to the LEDs in the LED layer 1070 and other signals as described above In alternative embodiments, the integrated driver and LED circuits 1005, 1085, 1095 may be mounted to a different base such as a glass base instead of the PCB 1010.

Figure 11:
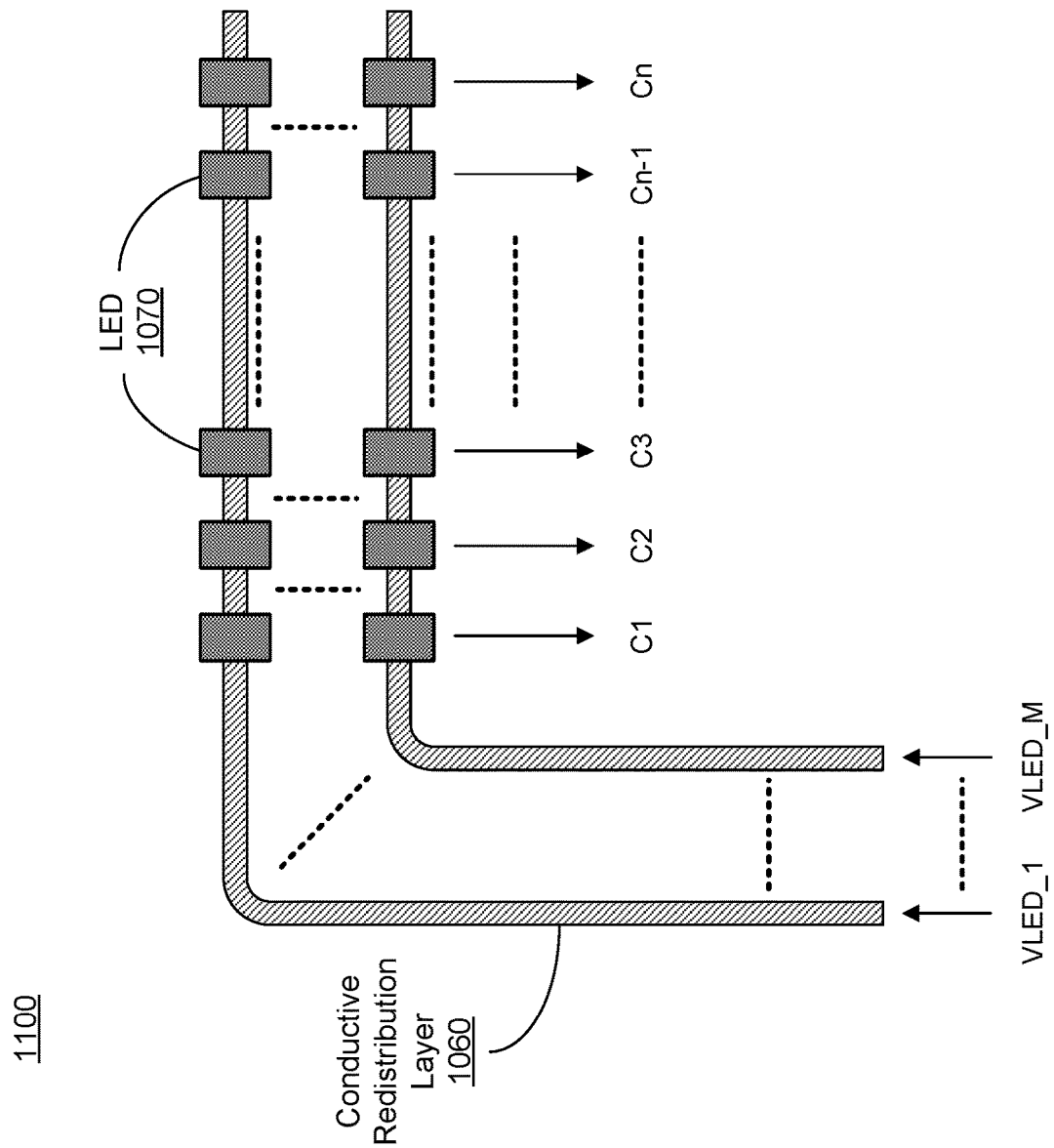
FIG. 11 is a top down view of a display device using an LED and driver circuit, according to one embodiment.

FIG. 11 is a top down view of a display device using an integrated LED and driver circuit 2300, according to one embodiment. The circuit 1100 can correspond to a top view of any of the integrated LED and driver circuits 1005, 1085, 1095 depicted in FIGS. 10A-10C. A plurality of LEDs of an LED lay 1070 is arranged in rows and columns (e.g., C1, C2, C3, . . . Cn−1, Cn). For passive matrix architectures, each row of LEDs of the LED layer 1070 is connected by a conductive redistribution layer 1060 to a demultiplexer which outputs a plurality of VLED signals (i.e., VLED_1 . . . VLED_M). The VLED signals provide power (i.e., a supply voltage) to a corresponding row of LEDs of the LED layer 1070 via the conductive redistribution layer 1060.

Figure 12:
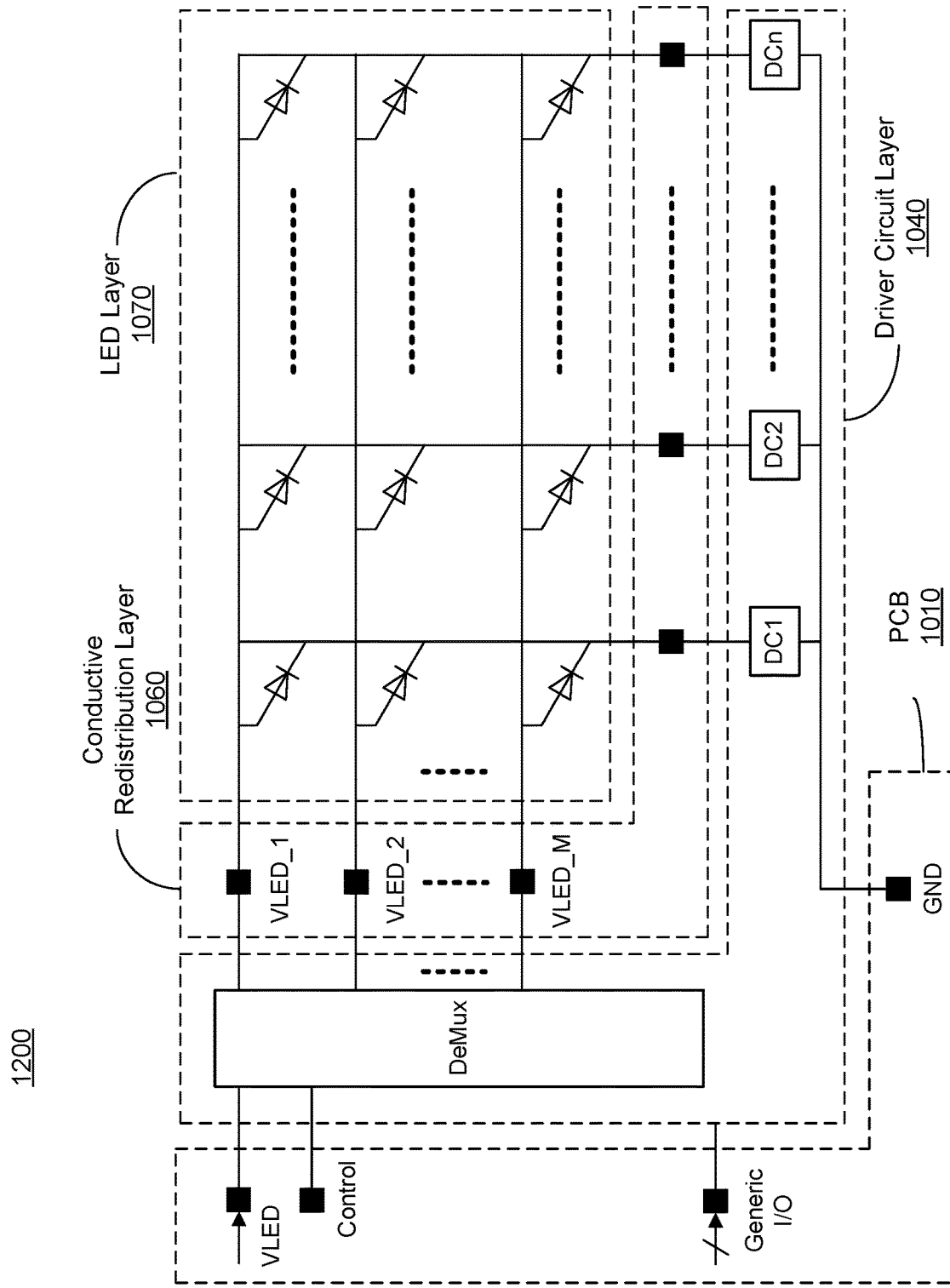
FIG. 12 illustrates a schematic view of several layers of an LED and driver circuit for a display device, according to one embodiment.

FIG. 12 illustrates a schematic view 1200 of several layers of a display device with an integrated LED and driver circuit, according to one embodiment. The schematic view includes the PCB 1010, the driver circuit layer 1040, the conductive redistribution layer 1060, and the LED layer 1070 as described in FIGS. 10A-10C. The schematic of FIG. 12 shows circuit connections for the circuits 1005, 1085, 1095 of FIGS. 10A-10C but does not reflect the physical layout. As described above, in the physical layout, the LED layer 1070 is positioned on top of (i.e., vertically stacked over) the conductive redistribution layer 1060. The conductive redistribution layer 1060 is positioned on top of the driver circuit layer 1040 and the driver circuit layer 1040 is positioned on top of the PCB 1010.

The PCB 1010 includes a connection to a power source supplying power (e.g., VLED) to the LEDs, a control circuit for generating a control signal, generic I/O connections, and a ground (GND) connection. The driver circuit layer 1040 includes a plurality of driver circuits (e.g., DC1, DC2, . . . DCn) and a demultiplexer DeMux. The conductive redistribution layer 1060 provides electrical connections between the driver circuits and the demultiplexer DeMux in the driver circuit layer 1040 to the plurality of LEDs in the LED layer 1070. The LED layer 1070 includes a plurality of LEDs arranged in rows and columns. In this example implementation, each column of LEDs is electrically connected via the conductive redistribution layer 1060 to one driver circuit in the driver circuit layer 1040. The electrical connection established between each driver circuit and its respective column of LEDs controls the supply of driver current from the driver circuit to the column. In this embodiment each diode shown in the LED layer corresponds to an LED zone. Each row of LEDs is electrically connected via the conductive redistribution layer 1060 to one output (e.g., VLED_1, VLED_2, . . . VLED_M) of the demultiplexer DeMux in the driver circuit layer 1040. The demultiplexer DeMux in the driver circuit layer 1040 is connected to a power supply (VLED) and a control signal from the PCB 1010. The control signal instructs the demultiplexer DeMux which row or rows of LEDs are to be enabled and supplied with power using the VLED lines. Thus, a particular LED in the LED layer 1070 is activated when power (VLED) is supplied on its associated row and the driver current is supplied to its associated column.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

The invention claimed is:

1. A display device comprising:
an array of light emitting diode zones each comprising one or more light emitting diodes that generate light in response to respective driver currents;
a control circuit to generate driver control signals and command signals;
a group of driver circuits distributed in the display area of the display device, the group of driver circuits to each drive a respective light emitting diode zone by controlling the respective driver currents in response to the driver control signals;
a set of serial communication lines coupled between adjacent driver circuits and to the control circuit in a serial communication chain,
wherein responsive to the command signals from the control circuit, a target driver circuit outputs a readback signal and the group of driver circuits propagates the readback signal from the target driver circuit through the serial communication chain to the control circuit.

2. The display device of claim 1, further comprising:
a power communication line coupled to the group of driver circuits and to the control circuit, the power communication line to provide a supply voltage to the group of driver circuits that is modulated with the driver control signals for controlling the driver circuits.

3. The display device of claim 2, wherein the supply voltage of the power communication line is further modulated to provide the command signals to the group of driver circuits.

4. The display device of claim 2, wherein the control circuit provides the command signals through the serial communication chain.

5. The display device of claim 1, further comprising:
a shared supply line coupled to the group of driver circuits to supply a voltage to the group of driver circuits; and
a shared command line coupled to the group of driver circuits and to the control circuit to sends the driver control signals and the command signals to the group of driver circuits.

6. The display device of claim 1, wherein the control circuit provides the command signals and the driver control signals through the serial communication chain.

7. The display device of claim 1, wherein the group of driver circuits propagate the readback signal in a forward direction through driver circuits successively further from the control circuit, and wherein a last driver circuit in the serial communication propagates the readback signal to the control circuit via a readback line.

8. The display device of claim 7, wherein the each of the driver circuits comprises a shared output pin to drive a corresponding light emitting diode zone during a driving period and to communicate with an adjacent driver circuit via the serial communication lines during a non-driving period.

9. The display device of claim 1, wherein the group of driver circuits propagate the readback signal in a reverse direction through driver circuits successively closer to the control circuit, and wherein a first driver circuit in the serial communication propagates the readback signal to the control circuit.

10. The display device of claim 9, wherein the each of the driver circuits detects a non-driving period of an adjacent driver circuit closer to the control circuit, and communicates via the serial communication lines during the detected non-driving period.

11. The display device of claim 1, wherein each of the driver circuits in the serial communication chain comprises:
a data input pin coupled to the control circuit or to a previous driver circuit in the serial communication chain;
a data output pin coupled to the control circuit or to a next driver circuit in the serial communication chain, and coupled to a corresponding LED zone to control driving of the corresponding LED zone;
a power line communication pin coupled to a power communication line providing a supply voltage modulated with the driver control signals and the command signals; and
a ground pin coupled to ground.

12. The display device of claim 1, wherein each of the driver circuits in the serial communication chain comprises:
a data input pin coupled to the control circuit or to a previous driver circuit in the serial communication chain to communicate the command signals and the readback signal;
a data output pin coupled to the control circuit or to a next driver circuit in the serial communication chain to communicate the command signals and the readback signal;

an LED driving output pin coupled to a corresponding LED zone to control driving of the corresponding LED zone;
a power line communication pin coupled to a power communication line providing a supply voltage modulated with the driver control signals; and
a ground pin coupled to ground.

13. The display device of claim 1, wherein each of the driver circuits in the serial communication chain comprises:
a data input pin coupled to the control circuit or to a previous driver circuit in the serial communication chain to communicate the driver control signals, the command signals, and the readback signal;
a data output pin coupled to the control circuit or to a next driver circuit in the serial communication chain to communicate the driver control signals, the command signals, and the readback signal;
an LED driving output pin coupled to a corresponding LED zone to control driving of the corresponding LED zone;
a power pin coupled to a supply voltage; and
a ground pin coupled to ground.

14. The display device of claim 1, wherein each of the driver circuits in the serial communication chain comprises:
a data input pin coupled to the control circuit or to a previous driver circuit in the serial communication chain;
a data output pin coupled to the control circuit or to a next driver circuit in the serial communication chain; and
an LED driving output pin coupled to a corresponding LED zone to control driving of the corresponding LED zone;
a dimming pin coupled to a shared command line providing the driver control signals;
a power pin coupled to a supply voltage; and
a ground pin coupled to ground.

15. The display device of claim 1, wherein responsive to a channel voltage readback command, a driver circuit receives a an incoming channel voltage value from a previous driver circuit in the serial communication chain, senses a local channel voltage associated with a corresponding LED zone, applies a function to the local channel voltage and the incoming channel voltage value to generate an outgoing channel voltage value, and outputs the outgoing channel voltage value to a next driver circuit in the serial communication chain.

16. The display device of claim 1, wherein responsive to a temperature sensing readback command, a driver circuit receives an incoming temperature value from a previous driver circuit in the serial communication chain, senses a local temperature associated with a corresponding LED zone, applies a function to the sensed temperature and the incoming temperature value to generate an outgoing temperature value, and outputs the outgoing temperature value to a next driver circuit in the serial communication chain.

17. The display device of claim 1, wherein the control circuit facilitates assignment of addresses to the driver circuits during an addressing mode based on addressing signals transmitted through the serial communication chain.

18. The display device of claim 1, wherein each of the LED zones and corresponding driver circuit are stacked over a substrate in an integrated package.

19. A driver circuit for a display device comprising:
control logic to operate in at least an addressing mode and an operational mode, wherein in the operational mode, the control logic obtains a driver control signal and controls a driver current to an LED zone based on the driver control signal, and wherein in the addressing mode, the control logic obtains an incoming addressing signal, stores an address for the driver circuit based on the incoming addressing signal, and generates an outgoing addressing signal based on the incoming addressing signal;
an LED driving output pin to sink the driver current during the operational mode; and
a data input pin to receive the incoming addressing signal during the addressing mode and to receive commands or data from a previous driver circuit in a serial communication chain during the operational mode;
a data output pin to output the outgoing addressing signal during the addressing mode and to output the commands or data to a next driver circuit in the serial communication chain during the operational mode;
a ground pin to provide a path to ground.

20. The driver circuit of claim 19, further comprising:
a power line communication pin coupled to a power communication line to provide a supply voltage and the driver control signal as digital data modulated on the supply voltage.

21. The driver circuit of claim 19, further comprising: a shared command line input pin to receive the driver control signals; and a power pin to receive a supply voltage.

22. The driver circuit of claim 19, wherein the control logic is configured to operate as a serial shift register to obtain an incoming driver control signal via the data input pin and to output an outgoing driver control signal via the output pin.

23. A zone integrated circuit for a display device comprising:
one or more LEDs of an LED zone;
a driver circuit stacked under the one or more LEDs on a substrate in an integrated package, the driver circuit comprising:
control logic to operate in at least an addressing mode and an operational mode, wherein in the operational mode, the control logic obtains a driver control signal and controls a driver current to an LED zone based on the driver control signal, and wherein in the addressing mode, the control logic obtains an incoming addressing signal, stores an address for the driver circuit based on the incoming addressing signal, and generates an outgoing addressing signal based on the incoming addressing signal;
an LED driving output pin to sink the driver current during the operational mode; and
a data input pin to receive the incoming addressing signal during the addressing mode and to receive commands or data from a previous driver circuit in a serial communication chain during the operational mode;
a data output pin to output the outgoing addressing signal during the addressing mode and to output the commands or data to a next driver circuit in the serial communication chain during the operational mode;
a ground pin to provide a path to ground.

24. The zone integrated circuit of claim 22, further comprising:
a power line communication pin coupled to a power communication line to provide a supply voltage and the driver control signal as digital data modulated on the supply voltage.

25. The zone integrated circuit of claim 22, further comprising:

a shared command line input pin to receive the driver control signals; and a power pin to receive a supply voltage.

26. The zone integrated circuit of claim 22, wherein the control logic is configured to operate as a serial shift register to obtain an incoming driver control signal via the data input pin and to output an outgoing driver control signal via the output pin.

* * * * *